United States Patent
Marullo et al.

(10) Patent No.: US 6,185,701 B1
(45) Date of Patent: Feb. 6, 2001

(54) AUTOMATED CLIENT-BASED WEB APPLICATION URL LINK EXTRACTION TOOL FOR USE IN TESTING AND VERIFICATION OF INTERNET WEB SERVERS AND ASSOCIATED APPLICATIONS EXECUTING THEREON

(75) Inventors: Frank Robert Marullo, Georgetown; Donald Husted Randall, Jr., Austin, both of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/976,263

(22) Filed: Nov. 21, 1997

(51) Int. Cl.$^7$ .................................................. G06F 11/00
(52) U.S. Cl. .................. 714/38; 709/219; 717/4
(58) Field of Search .................. 714/38; 395/704, 395/712, 201; 707/10, 104; 709/224, 219, 206, 203, 217; 717/217, 4

(56) References Cited

U.S. PATENT DOCUMENTS 5,838,919 * 11/1998 Schwaller et al. .................. 709/224
5,842,211 * 11/1998 Horadan et al. ...................... 707/10
5,881,237 * 3/1999 Schwaller et al. .................. 709/224
6,002,871 * 12/1999 Duggan et al. .......................... 714/4
6,044,398 * 3/2000 Marullo et al. ...................... 709/219
6,112,049 * 8/2000 Sonnenfeld ............................ 434/350

* cited by examiner

*Primary Examiner*—Robert W. Beausoliel, Jr.
*Assistant Examiner*—Pierre E. Elisca
(74) *Attorney, Agent, or Firm*—Robert M. Carwell

(57) ABSTRACT

A get request employing TCPIP sockets is issued which obtains requested HTML pages associated with the application from the web server. A search is executed extracting all links on the page automatically. The links are optionally sorted as designated in an input file or command line in random order so as to generate a typical access paths through the web server application during testing and verification thereof. The retrieved and extracted data is formatted and output in a common format employable in an input file by multiple test application tools which request, capture, store, verify data returned from, and stress the web servers and associated applications.

In a preferred embodiment, server port, and server name specified by host name or address, may be designated either in the input file or command line.

12 Claims, 28 Drawing Sheets

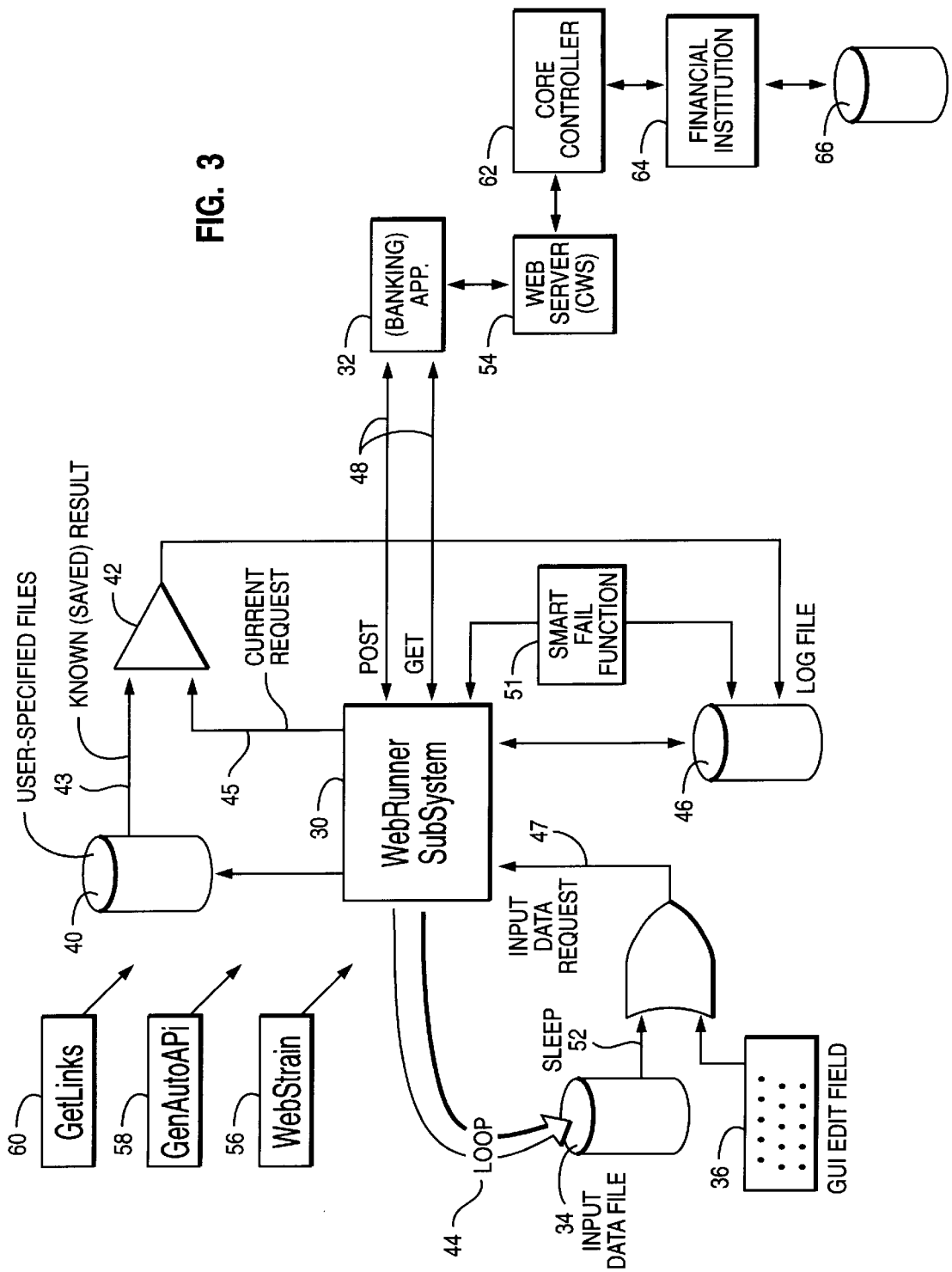

FIG. 4

WebRunner Application Version 2.0

Filenames
Input: MED.WBX
Output: WBRUNNER.

Mode
● Update  ○ Verify

Logging Level
○ 1  ○ 2  ○ 3  ○ 4  ● 5  ○ Off

Screen Msg Level
○ 1  ○ 2  ○ 3  ○ 4  ● 5  ○ Off

Security
○ SSL Off  ● SSL V3  ○ SSL V2
Cipher Specifications
[4]
SSL Timeout
[100]

Duration
● Repeat  [1]
○ Hours  [1]

Error Handling
Retries on Com errors [5]
Total error count to exit [999]

Server Settings
Name: wbank2.pals.austin.ibm.com
Port: 10022

Client Certificate
Keyring File: keyfile.kyr
Keyring Password: *********
☐ Certificate Required
Distinguished Name URL - Optional replaces Input Filename Log File Comments

[ Cancel ]    [ OK ]

FIG. 5

WebRunner Status

Settings

Begin Time: 15:22:58    Output File: WBRUNNER.

Logging Level: 5    Mode    SSL_VERSION: 3

Port: 10022    Update    Threads: 1

Server: wbank2.pals.austin.ibm.com

Variations

Run: 51    Pass: 49    Fail: 2    Recv Errors: 10

Total Vars: 51    Total Hours: 0    Hours Run: 0    Complete: 100 %

End Test

Customizable Web Server AutoAPI Test Tool

GenAutoAPI Date/Time: Mon Aug 4 16:03:15 CDT 1997

API List (Stored by JavaScript Transaction)

| JavaScript Transaction [parm count] (69 Total) | *.gmr File | FVT Test Counts (all/valid/invalid) (906/490/416) | Description [Priority] | Group |
|---|---|---|---|---|
| GenericGetUndeliveredMsgClass [2] | genundlv | 000/000/000 | Generic Get Undelivered Message Transaction [10000] | Custom CWS Classes |
| QuerySelfDefiningInfoClass [2] | qselfdef | 000/000/000 | Query SelfDefining Info [10000] | Custom CWS Classes |
| acct add srv class [6] | addacct | 010/005/005 | Add Account to Service Profile Transaction [2000] | Account Classes |
| acct baling class [3] | baling | 039/027/012 | Balance Inquiry Transaction [10000] | Account Classes |
| acct change nickname class [4] | nickname | 017/005/012 | Change Nickname Transaction [2000] | Account Classes |
| acct change pinpswd class [11] | pinpswd | 000/000/000 | Change Password [10000] | NOT documented |
| acct detail class [3] | acctdtl | 042/025/017 | Account Detail Transaction [2000] | Account Classes |
| acct history class [15] | accthist | 024/012/012 | Account History Transaction [2000] | Account Classes |

FIG. 9A

| | | | |
|---|---|---|---|
| acct info class [16] | acctinfo | 011/005/006 | Ask About Account Transaction [3000] | Account Classes |
| acct rem srv class [4] | remacct | 013/005/008 | Remove Account to Service Profile Transaction [2000] | Account Classes |
| appl logon class [6] | applogon | 003/001/002 | Application Logon Transaction [2000] | Unused |
| auth acct class [4] | authacct | 015/005/010 | IFS Authorize Online Registration Accounts Transaction [3001] | IFS Classes |
| bp addpayee class [28] | addpayee | 018/012/006 | Add Payee Transaction [500] | Bill Pay Classes |
| bp afixpymt class [20] | afixpymt | 018/009/009 | Add Fixed Amount Recurring Payment Transaction [2000] | Bill Pay Classes |

FIG. 9B

WebBank AutoAPI CWAPLET Test Tool

The purpose of this test tool is to exercise the Customizable Web Server Aplets (CWAPLETS).
This page was auto generated on *Wed Aug 6 13:27:53 CDT 1997* by GenCWAPLETS version 1.22
There were 94 total functions defined with 81 test files located. A total of 275 testcases are defined for those functions. The table below contains the functions that have testcases defined, see the table sorted by FVT testcase counts for the entire list of functions found.

FVT Testcases (Sorted by CWAPLET Functions)

| CWAPLET Functions | Test Counts | Group | JavaScript Source |
|---|---|---|---|
| Account Description Class | 14 | Constant Definitions Collection | cwaplets.js |
| Chop | 7 | JavaScript Enhancements | cwaplets.js |
| Class | 8 | JavaScript Enhancement | cwaplets.js |
| DEBUG dumpobj | 2 | Debugging Tool | cwaplets.js |
| DEBUG end | 2 | Debugging Tools | cwaplets.js |
| DEBUG local | 3 | Debugging Tool | cwaplets.js |

FIG. 12A

AUTOMATED CLIENT-BASED WEB APPLICATION URL LINK EXTRACTION TOOL FOR USE IN TESTING AND VERIFICATION OF INTERNET WEB SERVERS AND ASSOCIATED APPLICATIONS EXECUTING THEREON

TECHNICAL FIELD

This invention relates to Internet testing tools and, more particularly, to systems and methods for client-based web server application verification and testing.

BACKGROUND OF THE INVENTION

In the early stages of the phenomenal growth of the Internet, fairly simplistic web sites predominated, permitting the web "surfer" to simply and quickly access information displayed on a graphical user interface screen, and then log off. Such early web sites were relatively unsophisticated. However, as the richness and utility of the Internet began to cause its well-chronicled and explosive growth, the potential of the Internet began to be recognized by web site designers, and commercial enterprises. Thus, not only did web sites increase in complexity in terms of such things as hot links and nesting of pages, but additional richer features began to appear, such as the ability to post and get data downloaded to files and the dynamic changing of the web site as a function of user interaction or profiles whereby custom web pages would appear.

As the complexity and need for dependability of applications running on web servers increased (such as with the advent of commercial on-line banking and shopping transactions), the need arose to be able to rigorously test these more complex applications for their integrity and robustness. Turning to FIG. 1, depicted therein is a simplified view of the Internet environment in which such an application resides, including the mechanisms typically utilized prior to the subject invention for effecting such testing and verification of the Internet application. Typically a web server 10 is provided on which one or more web applications such as the banking application 12 are running. The web server 10 is interconnected to end users 16 and a core controller 14, the latter, in turn facilitating access to information, for example, of a financial institution 18 reposing on its respective databases 20. In such a typical Internet application as the illustrated banking application, this system thereby enables huge numbers of end users to quickly, efficiently, and in a secured fashion, transact their financial business with the financial institution over the Internet.

With the advent of these more serious and complex applications of the Internet and with the corresponding increasingly dire consequences which might arise from misbehavior of the various components of FIG. 1 and, in particular, those consequences arising from faults with the application 12 and server 10, a need arose to rigorously test these web server applications 12. One can readily appreciate the disaster awaiting a commercial concern such as an airline ticket reservation company or bank handling large volumes of transactions and dollar amounts on a daily business, should it be found that various logical program design flaws exist in the application 12. It is precisely for these reasons, that a great deal of research and technology development was directed at ways to test these applications for integrity prior to their introduction as a live application into the Internet. The prior manner of doing so is further illustrated in FIG. 1. In effecting such testing, it was conventional to provide for one or more testers 22 who would manually exercise the given application 12, often employing "screen scrapers" so as to capture and store in storage 24, various screen images delivered to the tester 22 from the application 12 as the tester(s) traversed the various links of the application.

Several problems are associated with this approach to testing of web server applications. First, the process was extremely slow due to the associated screen draws and saving of GUI data as well as the manual nature of the process. This manual aspect of the testing further led to failure to fully test the application due to links missed either by mistake or the sheer number of such links involved, failure to exhaust all possibilities of data input/output, inability to retest and compare data, and the like.

Attempts to automate the screen scraping tasks yielded some improvement but did not address even more serious flaws with the approach to validating Internet applications. The data which was being tested and saved often was browser dependent and really resulted in merely testing the browser front end and the images being returned thereby. However, what was really needed was an efficient and thorough way to exercise all of the APIs and code itself of the application running on the web server. In a typical application such as a banking application there may be literally hundreds of APIs and reference pages associated therewith for performing various functions such as login, account summaries, and so forth. This "back-end" of a given web server application therefore has associated with it an immense amount of program logic and data "gets" and "puts" such that it would be extremely desirable to be able to test and verify not only whether images from a particular browser are as expected, but that this data being entered and returned as a result of traversing the web site and its associated links was in fact correct. Thus a system was needed which, in an automated fashion, could test and verify the logic and data and associated myriad permutations and combinations of APIs and reference pages associated with a web server application rather than merely testing and debugging the browser and associated GUIs per se. Such a system was needed which, unlike the prior systems, could avoid saving data such as these GUI images which were not critical to testing this "back-end" logic and information developed by the server application.

As the sophistication of web server applications increased, yet an additional problem surface in facilitating the testing of the web applications. The ability to fashion dynamically configuring web server application pages soon developed in the maturation of the web which could build HTML pages on the fly. While it was known in the art to fashion static test cases to test web pages either in a manual or automated fashion, a difficulty arose in essentially providing for dynamic test cases which could test these changing web pages. Even in a static sense, making changes from a prior test (such as adding fields, changing fonts, moving images, resizing screens, etc.) would break test pages, and necessitate the rewriting of such tests. Moreover, when these changes could occur in a dynamic way as is currently the state of the art, this even compounded further the ability to test and verify web server applications in a meaningful way.

A related problem to this dynamic nature of web pages is that it was highly desirable to perform repeated tests on server applications whereby comparisons could be made to prior data. However, in the case of prior art, the data which was being saved (e.g., screens) was not the data critical to testing of the integrity of the underlying data. Rather, it was associated with the browser per se and thus was not the data and logic of paramount importance in verifying the web application itself. Thus, it was highly desirable to provide a mechanism for verifying data from repeat visits by comparison to previously acquired data.

In summary then, a need existed to be able to efficiently and automatically request, capture, store, and verify data returned from web servers disassociated from the particular browser itself, wherein such data related more importantly to the actual underlying data and logic of the server application. An ability was needed to run in an automated fashion to avoid errors and lack of thoroughness associated with manual traversal of web sites. Further, an ability was needed to discard data now critical to such verification and testing. Moreover, an option was highly desired for saving and reusing this returned data for the testing of subsequent transactions. Still further, it was highly desirable to avoid use of a conventional browser per se, so as to avoid the browser interfering with the tests which were of real interest (due to compatibility issues and the adverse affect on application performance attributable solely to the browser). A web server application testing mechanism was further needed which could accept links automatically from a data file as well as from a GUI edit field, save the returned pages, and further have the ability to verify these pages automatically and tally the results—all without user intervention.

In achieving the foregoing advancements, mention has already been made one inherent downside to the prior art technique of manual traversal of web sites, namely that due to the sometimes incredible number of permutations and combinations of links provided in web applications, it was frequently virtually impossible for any such manual traversal to exhaust, particularly in a reliable manner, the number of such links. Thus, a serious associated problem with providing for the aforementioned automated web server application verification and testing was the problem of devising a mechanism for extracting all known links on a given plurality of HTML pages in an automated fashion, and to format such link data so that it might subsequently used in the verification and testing of the application.

As will be hereinafter detailed, not only was it highly desirable to provide the aforementioned automated verification and testing of web server applications, but further to do so in a manner in which the particular web server and associated application could be stressed. It was necessary to invoke multiple instances of such testing so as to simulate real world conditions of multiple users accessing a web application in the same timeframe. Not only did the prior art fail to provide an efficient mechanism for extracting all such known links, but there was further no known comprehensive way to employ these automatically generated links in a common input which could be employed in combination by both (1) the web application verification and testing as well as (2) the web straining functionality just described.

In addition to the need for an efficient and reliable means for extracting links to be utilized for the aforementioned testing and verification, a need existed for a way to employ such links in a manner whereby they might be readily used and formatted in a manner so as to facilitate the testing of the transactions in question. Previously it was known to manually write test cases for various transactions of interest and further to manually transform these into HTML or Javascript pages which could thereafter be utilized in such testing.

However, due to the complexity of the links and transactions, such efforts were often futile, error prone, and not comprehensive. This complexity taught away from the possibility of an automated mechanism now made possible by the invention to traverse a large group of web transactions so as to build a cohesive set of HTML/Javascript pages which could in fact be employed in testing such transactions. Test cases were needed for testing transactions which could be stored in a definition file and run in conjunction with a tool to create web pages with all data needed to run tests and create setup files which could in turn be utilized by the other aforementioned automated tools for exercising the application APIs and straining the web server with replications of the virtual browser testing the web application and web server in question.

Yet an additional problem remained in providing a technology for testing a web server and associated web application in a realistic manner so as to know in advance in the real world how they will perform. Not only was there the problem of acquiring all relevant links, efficiently fashioning them into a format that could be utilized to test the server and application, and thereafter providing the mechanism for doing so which could test for the integrity of the real data of interest (rather than merely capturing GUIs, testing for browser inadequacies, and the like), but it was further necessary to ensure in the testing that the server was being tested in a realistic manner as might be expected in a real environment. In the prior art, test vehicles most assuredly existed for simulating a user's traversal of a web site. However, the actual behavior of a web site in real world conditions, wherein multiple users might be hitting the server in the same time interval, was such that the behavior characteristics of such a server and corresponding application might differ radically from the case in which the server/application are being tested by a single test program.

A conventional solution to this problem of more realistically simulating the real world environment in server-application testing was to, in a brute force manner, simply provide in real time for a multiplicity of human test users who, at the same time, might access the same server/application in order to "stress" it. Obvious limitations in availability of trained test personnel resulted in inadequate testing by a number of simultaneous users far less than might be expected in real world conditions. This thereby resulted in unreliable test results not mirroring what was to be expected in the actual environment in which the server/application would reside.

Accordingly, a more effective technology was sorely needed which could provide the ability to stress and exercise a web server by simulating multiple users accessing the server simultaneously or in a staggered fashion. This need included the ability to perform such web stressing employing fast, non-stop posts and gets from the web server, such a requirement not being met by conventional browsers which would require up to perhaps 50 or more manual users.

SUMMARY OF THE INVENTION

A get request employing TCPIP sockets is issued which obtains requested HTML pages associated with the application from the web server. A search is executed extracting all links on the page automatically. The links are optionally sorted as designated in an input file or command line in random order so as to generate atypical access paths through the web server application during testing and verification thereof. The retrieved and extracted data is formatted and output in a common format employable in an input file by multiple test application tools which request, capture, store, verify data returned from, and stress the web servers and associated applications. In a preferred embodiment, server port, and server name specified by host name or address, may be designated either in the input file or command line.

BRIEF DESCRIPTION OF THE DRAWINGS

FIG. 3 is a more detailed functional block diagram of the webrunner subsystem of the system depicted in FIG. 2;

FIG. 4 is a representative user interface screen for selecting webrunner options similar to those of the GUI edit field options depicted in Table 1 for the web runner subsystem of the system of FIG. 1;

FIG. 5 is a representative user interface screen depicting a typical summary status output of the webrunner subsystem of FIG. 1;

FIGS. 9A and 9B are a representative user interface screen of autoAPI test cases of FIG. 8 sorted by Javascript transaction;

FIGS. 12A and 12B are a representative user interface screen depicting the CWAPLET test cases of FIG. 8 in more detail;

DETAILED DESCRIPTION OF THE PREFERRED EMBODIMENT

Figure 1:
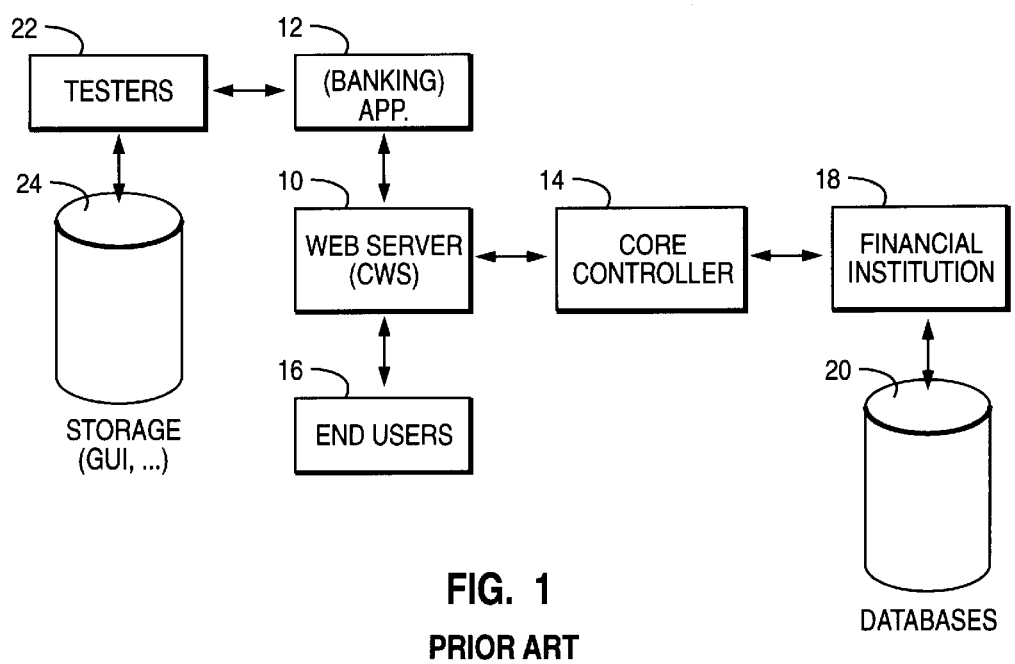
FIG. 1 is an overview of an Internet System, including a web server and representative banking application depicting the prior art system for application testing and verification.
Figure 2:
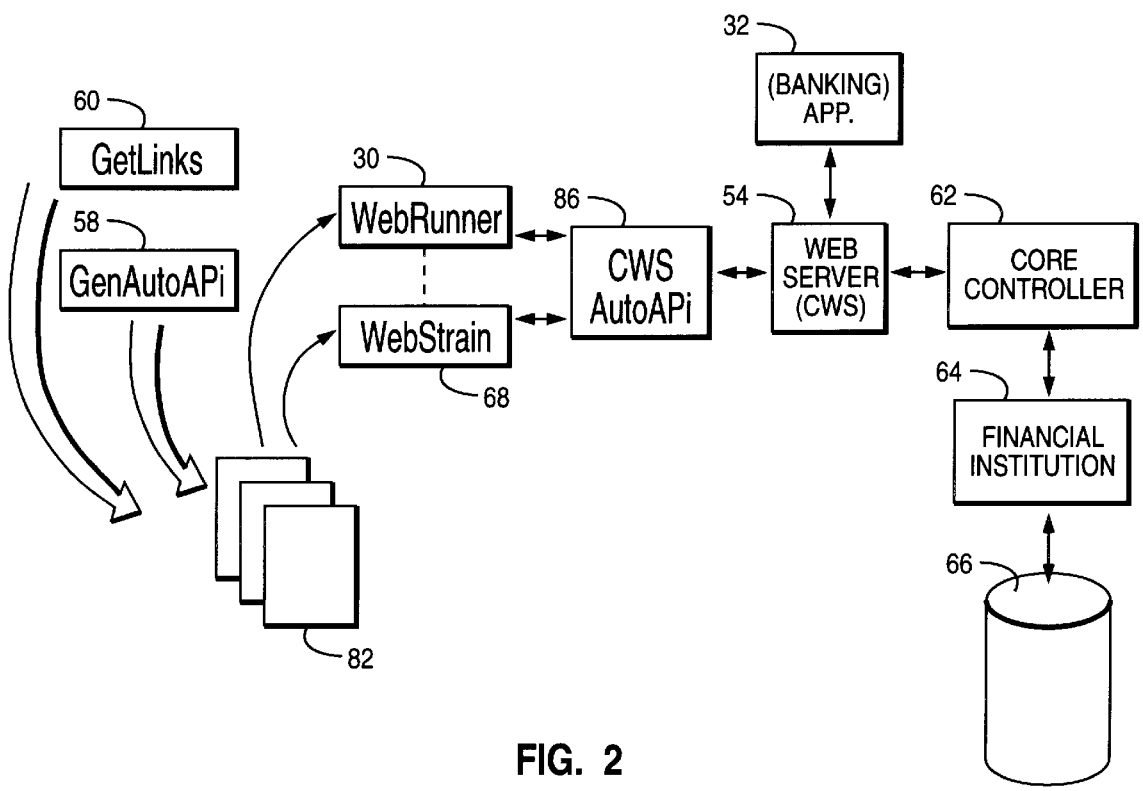
FIG. 2 is a functional block diagram overview of the system of the invention.

Turning first to FIG. 2, depicted therein is a functional block diagram overview of the system of the invention. It is assumed that one or more Internet applications such as the banking application 32, executing on a customizable web server 54, is desired to be tested for performance and integrity of the application in terms of the data delivered to a client from a financial institution and conversely data delivered to the financial institution 64, from the client. It is assumed that a communication path is established from the server(s) 54, to the institution 64 through a core controller 62. It is further assumed that the institution has a vast amount of information stored representatively in one or more databases 66 from which data to the client is to be retrieved in an accurate manner or updated in response to client interaction with the web application 32.

It will be recalled from the background discussion that an automated client-based web server application verification tool (hereinafter generically referred to for convenience as "webrunner") was needed. More particularly the need existed to provide the ability to request, capture, store, and verify data returned from web servers 54 (and, of course, ultimately from the financial institution 64). More importantly, however, due to the inadequacies of manual testing, a system was further needed that provided the ability to run in an automated fashion, discarding data which was not critical to the testing (such as the aforementioned graphics data of conventional screen scrapers), and which provided the option of saving and reusing returned data for subsequent transaction use and testing.

As previously discussed, prior art solutions of employing conventional browsers were unacceptable due to the compatibility and performance issues they introduced, as well as the drawbacks to driving the transactions to be test by recording user input and mouse movements. For enhanced utility, a web server application tool was needed versatile enough to accept links from a GUI edit field or a data file in the alternative, save the returned pages from the application 32, and moreover provide the ability to verify such pages, and tally the results, all without user intervention. Such functionality is provided by the webrunner 30 subsystem to be hereinafter described in greater detail.

It will be noted in passing that although, in the embodiment herein depicted, a banking application is illustrated for interaction with a financial institution 64, the invention is not intended to be so limited and admits to application to any of a wide variety of website applications interfacing with appropriate corresponding data residing in databases 66. It was simply felt that the complexity associated with banking transactions in terms of the sheer volumes of data and permutations, the seriousness of such applications dictating incredibly high standards of reliability and opportunities for failure, most appropriately highlighted the applicability of the invention in such demanding environments.

Still referring to FIG. 2, it will further be recalled that in order to vigorously exercise all of the permutations and combinations of interactions possible with such a web server application 32, a need existed to extract all known links on a given HTML page, as well as to extract this data from a plurality of nested and linked such HTML pages. Moreover, in order to effect a practical solution to the requirements of a web server application verification tool such as the webrunner, a further need was to format such data comprised of these links so that it may be used by the other subsystems of the verification system, such as the aforementioned webrunner and/or the "webstrain" (to be hereinafter described) test tools. Accordingly, an additional subsystem hereinafter referred to generically as "getlinks", 60, is provided to effectuate such requirements.

Still referring to FIG. 2, in order to implement a generic practical automated web server application verification and test functionality, it was not only necessary to provide a function such as that delivered by the getlinks subsystem 60 to automatically glean known links associated with such a server application 32, but to provide some form of automated mechanism which could traverse a large group of web banking transactions so as to build a cohesive set of HTML/Javascript pages that could be employed to test the transactions. Thus, an additional subsystem hereinafter generically referred to as "genautoAPI", 58, is provided. Although this subsystem will be described hereinafter in greater detail, for the present purpose it is sufficient to note that test cases may be written for the banking transaction and stored in a definition file. The function of the genautoAPI subsystem 58 tool is to, upon execution, create web pages employing the definition file, with such pages including all of the data necessary to run the aforementioned necessary tests on the web application 32, and specifically to create a setup file which may be used by the previously noted webrunner 30 and webstrain 68 automated tools, as well as any other automated tools as may be required. It is a feature of the genautoAPI subsystem 58, of particular utility that such setup file may be genericized so as to be utilized both by the webrunner 30, webstrain 68 subsystems, as well as any other automated tools as may be desired.

Finally, and still referring to FIG. 2, and as also noted briefly in the Background of the Invention, merely testing a web server application 32 by a single instance of a testing vehicle such as the webrunner subsystem 30 would not necessarily provide an accurate indication of the performance of the application 32 in real world conditions. This is because in the actual Internet environment wherein such an application resides, it is well known that multiple users will be accessing the application 32 at various times. Accordingly, a need further arose to provide an ability to more closely emulate this multiple user environment. The previously noted webstrain subsystem 68 is thus further provided to perform the function of stressing and exercising the web server 54 by simulating in an automated fashion multiple users accessing the server 54 simultaneously. As will be more readily understood hereinafter in a more detailed description of this subsystem, essentially a facility was needed to be provided which would employ fast, non-stop posts and gets from the server 54 which could not be effected by employing conventional browsers with up to 50 or more manual user/testers.

Now that an overview has been provided of the system of FIG. 2, the various subsystems, namely the webrunner subsystem 30, webstrain subsystem 68, genautoAPI subsystem 58, and getlinks subsystem 60 will be hereinafter described in greater detail.

Webrunner Subsystem

Turning now to FIG. 3, depicted therein is a functional block diagram illustrating the webrunner subsystem and its respective components. The webrunner functionality 30 may be thought of as a virtual dynamic web browser for performing automated web server application verification and testing. The application 30 exercises and verifies web server applications 32 and scripts by simulating a web browser using, in a conventional application, TCPIP sockets.

In operation, the webrunner subsystem 30 may receive input either from an input data file 34 or alternatively from a user/tester employing GUI edit field input 36. The webrunner subsystem is highly flexible, allowing port, server, logging levels, screen messaging levels, and the ability to store requested data in user-specified individual unique files for later verification, such storage being depicted functionally by storage 40. The webrunner subsystem 30 provides a mechanism for verifying this saved data by a comparison, shown functionally by comparator 42 of the known or saved result(s) of previous traversal of the web application, represented as reference numeral 43, with a current request for data from the server application 32, depicted in FIG. 3 as reference numeral 45.

Repeat features are definable in order to loop through the input data 47, schematically depicted as loop 44, for as many iterations as specified in the input data, including a "repeat indefinitely" option for reliability testing purposes as desired. A log file, shown representationally as storage 46 is provided wherein each actual request, arising from the input data 47, the number of bytes received, the time of transaction, the result of the compares from comparator 42, and the like may be stored in the log file 46.

In addition, the webrunner subsystem 30 will also store in storage 40 the data returned, including header information into individual unique files. A verify option eliminates manual verification with all its deficiencies well known in the prior art, by providing a pass/fail status for each request, and a total pass/fail count for all requested pages. Timing mechanisms are provided in the webrunner subsystem 30 to record transfer time, for example up to resolutions of $\frac{1}{100}$th of a second or otherwise as desired. The subsystem 30 further provides for support of Posts and Gets 48, to and from the server application 32, with standards being defined for each. A byte count for each such request, and total number of bytes transferred are logged in the log file 46, as is total throughput calculated at termination time.

A smart fail function 51, is further provided which keeps track of requests that failed previously, and further updates, in the log file 46, the number of fails it contributed to the total. Critical requests (logon) etc., may be labelled and must be successful to continue. Sleep values 52 may be specified between requests to simulate actual users, test session timeouts, and the like. The servers 54 may be accessed by either host name or dot address and accessed through the port specified. GUI edit field options 36 are provided to override server and port definitions, thereby allowing for testing of different servers and ports without necessitating changing the input data files 34. The GUI edit field option 36 further provides for an option to terminate after a specified number of errors, to specify the number of retries on communication errors, and to set levels of messaging for the log file 46.

The format in a representational embodiment of the webrunner subsystem for the input data file(s) 34 are as follows:

Format of Input Data File to Webrunner/Webstrain

```
The format of the input file defined by the -d can include the
following:
<Server>name - name of server to access ( supports Hostbyname and
HostbyAddress )
<Port>port number - port to access server through
<Sleep>number - time to sleep between transactions
POST&:.filespec/file&:.data - data to POST to filespec/file
<Prereq>filespec/file - identifies this as a prerequisite
transaction.
filespec/file1 - file to GET data from
# comments - additional requests below
filespec/file2 - additional files to GET data from
Uilespec/file3 - additional files to GET data from
NOTE: Server must be specified either in input data or on command
line
#Use Server Webbank, port 10005

<Server>Webbank
<Port>10005
# Identify this a s a prerequisite, if we can't logon exit.

<Prereq> POST:/logon/userid=FRANK&password=12345
# Request wbmain.html from the server webbank2
# in the directory pages.

pages/wbmain.html

# Requests wblogo.gif from the server webbank2
# in the directory pics

pics/wblogo.gif

# Requests index.html (default) from the
# server webbank2 in the in the directory pages.

webbank2/pages
# Sleep for 30 seconds, then continue
<Sleep>30
webbank2/pages1
```

An actual input data file instance for the webrunner subsystem in the implementation of the invention presently under discussion may be seen as follows:

Input Data File for Webrunner

```
<Server>wbank1.pals.austin.ibm.com
<Port>10005
# WebRunner/WebStrain data generated by GenAutoAPI Version 1.10 on
Thu Jun 12 11:03:41 CDT 1997
# Data is for MQWeb- Valid/Invalid testcases
/logon/
<Prereq>POST:/proclogin.ns:UserID=AIF01&Pin=PIN01&Password=
PASSWD01&PageGood=/fvtref/registerc.html
/fvtref/!addpayee_test_fvt.html?arg1=1&arg2=null&arg3=
907&arg4=915&arg5=908&arg6=round
<Sleep>10
/fvtref/!addpayee_test_fvt.html?arg1=1&arg2=null&arg3=
908&arg4=9&arg5=98&arg6=Austin&a
<Sleep>10
/fvtref/!addpayee_test_fvt.html?arg1=1&arg2=null&arg3=
909&arg4=95&arg5=900&arg6=BocaRa
<Sleep>10
/fvtref/!addpayee_test_fvt.html?arg1=1&arg2=null&arg3=
1107&arg4=9150&arg5=9080&arg6=ro
<Sleep>10
/fvtref/!addpayee_test_fvt.html?arg1=1&arg2=null&arg3=
7&arg4=15&arg5=8&arg6=karachi&ar
<Sleep>10
/fvtref/!chgpayee_test_fvt.html?arg1=1&arg2=null&arg3=
1&arg4=1&arg5=2&arg6=2&arg7=1&ar
<Sleep>10
/fvtref/!chgpayee_test_fvt.html?arg1=1&arg2=null&arg3=
2&arg4=2&arg5=2&arg6=2&arg7=2&ar
<Sleep>10
/fvtref/!chgpayee_test_fvt.html?arg1=1&arg2=0&arg3=1&arg4=
1&arg5=1&arg6=1&arg7=1&arg8=
<Sleep>10
/fvtref/!chgpayee_test_fvt.html?arg1=1&arg2=0&arg3=1&arg4=
1&arg5=2&arg6=2&arg7=1&arg8=
<Sleep>10
/fvtref/!chgpayee_test_fvt.html?arg1=1&arg2=null&arg3=1&arg4=
1&arg5=2&arg6=2&arg7=1&ar
<Sleep>10
/fvtref/!delpayee_test_fvt.html?arg1=1&arg2=null&arg3=null&arg4=
null
<Sleep>10
/fvtref/!delpayee_test_fvt.html?arg1=1&arg2=null&arg3=1&arg4=1
<Sleep>10
/fvtref/!delpayee_test_fvt.html?arg1=1&arg2=0&arg3=0&arg4=1
<Sleep>10
/fvtref/!delpayee_test_fvt.html?arg1=1&arg2=null&arg3=2&arg4=3
<Sleep>10
/fvtref/!delpayee_test_fvt.html?arg1=1&arg2=0&arg3=0&arg4=2
<Sleep>10
/fvtref/!delpayee_test_fvt.html?arg1=1&arg2=null&arg3=4&arg4=5
<Sleep>10
/fvtref/!delpayee_test_fvt.html?arg1=1&arg2=0&arg3=0&arg4=0
<Sleep>10
/proclogoff.ns
<Sleep>10
/logon/exit.html?Status_Code=0
```

A sample of data generated by the webrunner illustrating such data files for use by the webrunner subsystem may be seen depicted in FIG. 5.

Subsystem may be seen as follows:

```
<Server>internet.test.ibm.com
<Port>1080
<SSL>3
# WebRunner/WebStrain data generated by GenAutoAPI Version 1.22 on
Wed
Aug 6 13:11:27 CDT 1997
# Data is for default MQWeb - Valid/Invalid testcases
<Prereq>POST:/proclogin.ns:UserID=ID01&Pin=PIN01&Password=
PASSWD01&PageGood=/fvtref/registerc.html
/
fvtref/!addpayee_test_fvt.html?arg1=1&arg2=null&arg3=907&arg4=
```

-continued

915&arg5=908&arg6=roundrock&arg7=texas&arg8=78664&arg9=
2468031&arg10=null&arg11=null&arg12=null&arg13=23&arg14=
2&arg15=2&arg16=123456&arg17=2&arg18=null&arg19=null&arg20=
null&arg21=2&arg22=2&arg23=null&arg24=null&arg25=null&arg26=
null&arg27=null&arg28=2
/fvtref/!tfring_test_L_fvt.html?arg1=1&arg2=null&arg3=12&arg4=5&arg5=2&
arg6=1/15/96&arg7=12/25/96&arg8=50&arg9=500
/fvtref/!blring_test_fvt.html?arg1=1&arg2=null&arg3=6&arg4=
IRS&arg5=907DuolbeFileTR&arg6=908Double
/fvtref/!delpayee_test_fvt.html?arg1=1&arg2=null&arg3=null&arg4=null
/fvtref/!payeedt1_test_fvt.html?arg1=1&arg2=null&arg3=1&arg4=2
/fvtref/!payeeing_test_fv
t.html?arg1=1&arg2=null&arg3=2&arg4=1&arg5=2&arg6=2
/fvtref/!paying_test_fvt.html?arg1=1&arg2=null&arg3=1&arg4=
2&arg5=3&arg6=4&arg7=5&arg8=6&arg9=7&arg10=8&arg11=9&arg12=
10&arg13=11&arg14=12&arg15=13&arg16=14&arg17=15&arg18=
16&arg19=17&arg20=1&arg21=null&arg22=null&arg23=null&arg24=
null&arg25=null&arg26=null&arg27=null&arg28=null&arg29=
null&arg30=1&arg31=null&arg32=null&arg33=null&arg34=
null&arg35=null -continued /fvtref/!pydefing_test_fvt.html?arg1=1&arg2=null&arg3=1&arg4=
2&arg5=2&arg6=1&arg7=1&arg8=1&arg9=1&arg10=2&arg11=2
/fvtref/!chpyinst_test_fvt.html?arg1=1&arg2=
null&arg3=1&arg4=2&arg5=1&arg6=1&arg7=1&arg8=1&arg9=
2&arg10=3&arg11=2&arg12=1&arg13=1&arg14=1&arg15=
$100.00&arg16=1997/01/01&arg17=1
/fvtref/!depyinst_test_fvt.html?arg1=1&arg2=null&arg3=1&arg4=2
/fvtref/!addacct_test_fvt.html?arg1=1&arg2=null&arg3=1&arg4=2
/fvtref/!nickname_test_fvt.html?arg1=1&arg2=null&arg3=1&arg4=IRS
/fvtref/!acctdt1_test_fvt.html?arg1=1&arg2=null&arg3=1
/fvtref/!baling_test_fvt.html?arg1=1&arg2=null&arg3=0
/proclogoff.ns An actual representative log file 46 which may be produced by an instance of the webrunner subsystem 30 executing would appear as follows:

Log File of Webrunner

TESTLOG Version 2.04.00 (13 Jun 1994)
WBRUNNER( 5DA) starting at 12:01:11 on 06/27/1997
WBRUNNER( 5DA   2)-0000 0000 7| Thread \SEM32\WBRUNNER00 - URL = /logon/
WBRUNNER( 5DA   2)-0001 0000 5| Variation 0001 starting
WBRUNNER( 5DA   2)-0001 0000 9| Thread \SEM32\WBRUNNER00 Buflen =144
WBRUNNER( 5DA   2)-0001 0000 9| Thread \SEM32\WBRUNNER00 SENDING:
GET /logon/ HTTP/1.0
Connection: Keep-Alive
User-Agent: WebRunner /1.61(OS/2)
Accept: image/gif, image/x-xbitmap, image/jpeg, image/pjpeg, */*
WBRUNNER( 5DA   2)-0001 0000 9| Thread \SEM32\WBRUNNER00 - No Content length:
WBRUNNER( 5DA   2)-0001 0000 7| Thread \SEM32\WBRUNNER00 - recv( ) 1452, so far = 1567
WBRUNNER( 5DA   2)-0001 0000 7| Thread \SEM32\WBRUNNER00 - recv( ) 1411, so far = 2978
WBRUNNER( 5DA   2)-0001 0000 7| Thread \SEM32\WBRUNNER00 - recv( ) 0, so far = 2978
WBRUNNER( 5DA   2)-0001 0000 9| Thread \SEM32\WBRUNNER00 - Done Receive 2978 bytes
WBRUNNER( 5DA   2)-0001 0000 5| Variation 0001 PASS
WBRUNNER( 5DA   2)-0000 0000 5| Output file = WBRUNNER.0
WBRUNNER( 5DA   2)-0000 0000 5| Time for transaction = 0 min, 0.32 seconds
WBRUNNER( 5DA   2)-0000 0000 7| Thread \SEM32\WBRUNNER00 - URL = <Prereq>POST:/proclogin.ns:UserID=AIF01&Pin=PIN01&Password=PASSWD01&PageGood=/fvtref/registerc.html
WBRUNNER( 5DA   2)-0002 0000 5| Variation 0002 starting
WBRUNNER( 5DA   2)-0002 0000 9| Thread \SEM32\WBRUNNER00 Buflen =290
WBRUNNER( 5DA   2)-0002 0000 9| Thread \SEM32\WBRUNNER00 SENDING:
POST /proclogin.ns HTTP/1.0
Connection: Keep-Alive
User-Agent: WebRunner /1.61(OS/2)
Accept: image/gif, image/x-xbitmap, image/jpeg, image/pjpeg, */*
Content-type: application/x-www-form-urlencoded
Content-length: 72
WBRUNNER( 5DA   2)-0039 0000 9| Thread \SEM32\WBRUNNER00 - No Content length:
WBRUNNER( 5DA   2)-0039 0000 7| Thread \SEM32\WBRUNNER00 - recv( ) 1451, so far = 1566
WBRUNNER( 5DA   2)-0039 0000 7| Thread \SEM32\WBRUNNER00 - recv( ) 0, so far = 1566
WBRUNNER( 5DA   2)-0039 0000 9| Thread \SEM32\WBRUNNER00 - Done Receive 1566 bytes
WBRUNNER( 5DA   2)-0039 0000 5| Variation 0039 PASS
WBRUNNER( 5DA   2)-0000 0000 5| Output file = WBRUNNER.38
WBRUNNER( 5DA   2)-0000 0000 5| Time for transaction = 0 min, 0.60 seconds
WBRUNNER( 5DA   1)-0000 0000 5| Thread:\SEM32\WBRUNNER00 Bytes Recd: 35733
WBRUNNER( 5DA   1)-0000 0000 5| Total Bytes Recd =35733

-continued

```
WBRUNNER( 5DA   1)-0000 0000 5| Total Transfer Time =0:3:18.56
WBRUNNER( 5DA   1)-0000 0000 5| Server Output = 179 bytes per second
WBRUNNER( 5DA   1)-0000 0000 5| Total Receive Errors: 0
WBRUNNER( 5DA)                PASS| WBRUNNER.EXE done
WBRUNNER( 5DA) stopping at 12:04:41 on 06/27/1997
Variations 39 Run 39 Pass 39 Fail 0 (100%)
STATUS WBRUNNER AUTO BASE RUN 39 PASS 39 FAIL 0 AUTOFAIL 0
```

An example of an output file in the storage 40 of the webrunner subsystem would appear as follows:
Output File of Webrunner

```
HTTP/1.0 200 OK
Server: Netscape-Enterprise/2.01
Date: Mon, 30 Jun 1997 17:56:56 GMT
Content-type: text/html
<HTML>
<HEAD>
<!--
Licensed Materials - Property of IBM
        5648-A06
          © Copyright IBM Corp. 1996 All Rights Reserved
          US Government Users Restricted Rights - Use, duplication
          or disclosure restricted by GSA ADP Schedule Contract
          with IBM
-->
    <TITLE>
        WebBank Interactive Banking: Logon and Connect
    </TITLE>
        HTML PAGE WOULD APPEAR HERE ...
</BODY>
</HTML>
```

A sample output summary status of execution of the webrunner subsystem may be seen in the representative user interface screen depicted in FIG. 5.

From the foregoing, it will be readily appreciated that the webrunner subsystem 30 provides for a virtual browser for testing of web servers and associated applications without the dependency upon an actual web browser such as the Netscape Navigator or Internet Explorer of the Netscape and Microsoft Corporations, respectively. By avoiding such dependency on real browsers, the capturing of data from the web server application may be accomplished in minutes automatically without the necessity for manually navigating through pages, thereby reducing time and errors.

Getlinks Subsystem

Figure 6:
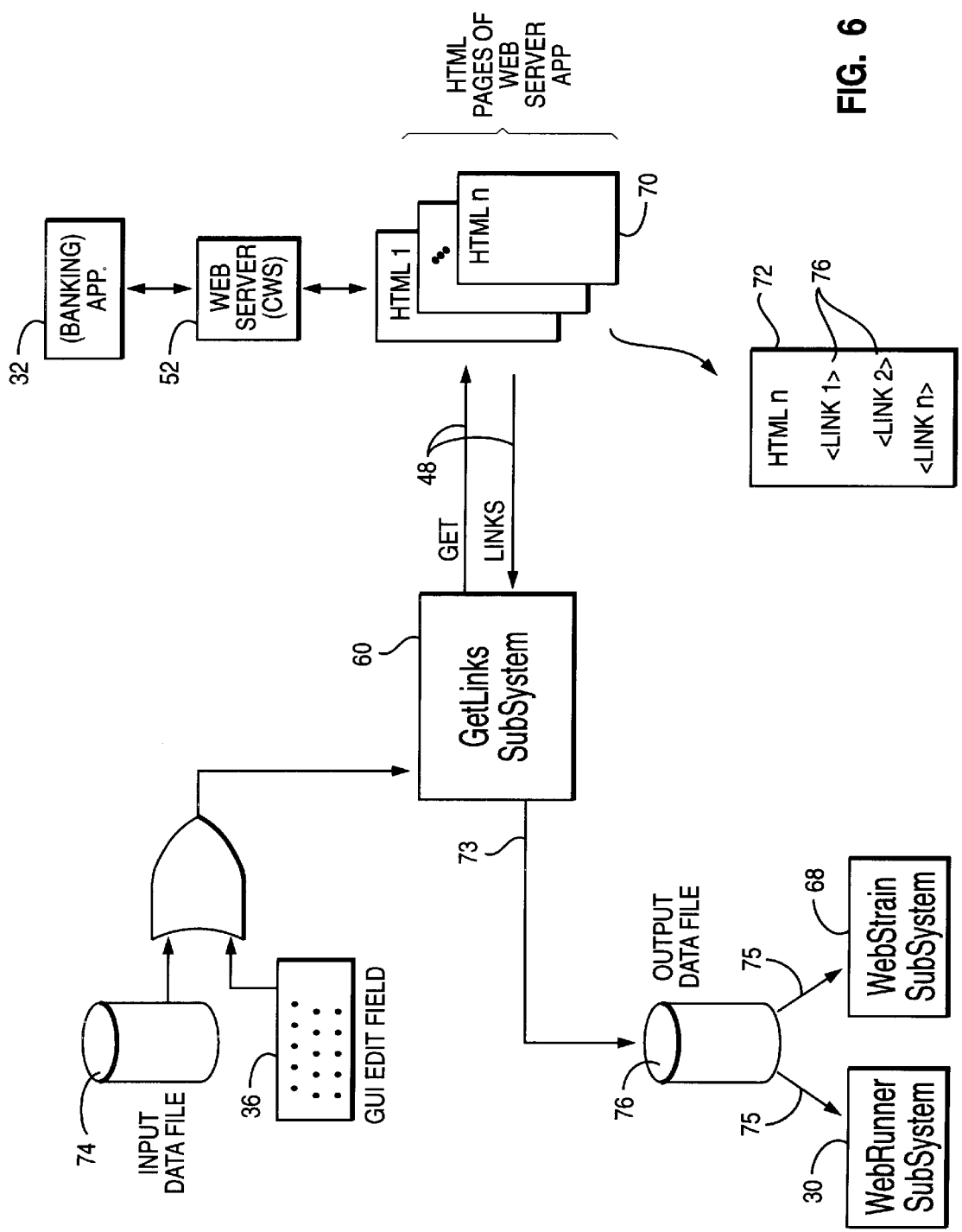
FIG. 6 is a more detailed functional block diagram of the getlinks subsystem of the system depicted in FIG. 2.

FIG. 6 depicts an overview functional block diagram of the getlinks subsystem or application 60 of FIGS. 2 and 3. It will be recalled that given the richness of typical server applications 32 these days in terms of their hotspots and links to other links applications, that the prior art methods of manually attempting to extract known links became unfeasible and fraught with error. Accordingly, a subsystem was needed which could format data so that it could be utilized, preferably in a common format, by the webrunner virtual browser 30 and the webstrain application 68 to provide multiple instances of the webrunner in order to stress the server application 32 and server 54.

With the foregoing in mind, a getlinks subsystem or application 60 is provided as shown in FIG. 6 employing, in a preferred embodiment, TCPIP sockets, which can perform the get function 48 to obtain requested HTML pages 70 from the web server 52, and search through these pages so as to extract all of the links 76 found on each individual such page, such as the page representationally shown at reference numeral 72.

Options are incorporated in the getlinks subsystem 60 of FIG. 6 so as to cause the links to be sorted in a random order in order to create non-typical access paths through the web server application 32. As was the case with the webrunner tool 30, the server 52 name can be specified in employing the getlinks subsystem 60, both in terms of host name or host address, and supplied either in an input data file 74 or through the vehicle of a GUI edit field input 36. The server port is preferably overrideable from such GUI edit field input 36 (the default port in the preferred embodiment being 80) with the specification of this port preferably being incorporatable into the input data file 74. It is a feature of the getlinks subsystem 60 to provide the output data file 76 in a format such that it may ultimately be utilized as input 75 to both the webrunner subsystem 30 as well as the webstrain subsystem application 68.

By providing for the aforementioned automated client-based web universal resource (link) extraction tool, such automation avoids the inadequacies associated with user testing and intervention wherein manual users might otherwise be required to request pages, view document source, and document all of the links (assuming they were found without error) associated with the HTML pages 70. The getlinks subsystem accordingly automatically finds all links 76 on each page 72, and moreover formats the output data 73 (e.g., links found) for use by the other test tools, e.g., the webrunner and webstrain applications 30 and 68, respectively.

A representative getlinks output data file 76 would appear as follows:
Getlinks Output Data File

```
<Server>webbank2
/gmref/!addacct_doc.html
/gmref/!addacct_test.html?arg1=1&arg2=2
/gmref/!addacct_test.html?arg1=2&arg2=1
/gmref/!baling_doc.html
/gmref/!baling_test.html?arg1=1
/gmref/!baling_test.html?arg1=2
/gmref/!baling_test.html?arg1=3
/gmref/!acctdt1_doc.html
/gmref/!acctdt1_test.html?arg1=1
/gmref/!acctdt1_test.html?arg1=2
/gmref/!acctdt1_test.html?arg1=3
/gmref/!accthist_doc.html
/gmref/!accthist_test.html?arg1=1&arg2=7/20/96&arg3=12/20/96&arg4=
100&arg5=200&a
/gmref/!accthist_test.html?arg1=1&arg2=7/20/96&arg3=12/20/96&arg4=
200&arg5=500&a
/gmref/!accthist_test.html?arg1=1&arg2=7/20/96&arg3=12/20/96&arg4=
300&arg5=1000&
```

-continued

```
/gmref/!nickname_doc.html
/gmref/!nickname_test.html?arg1=1
/gmref/!nickname_test.html?arg1=2
/gmref/!nickname_test.html?arg1=3
/gmref/!remacct_doc.html
/gmref/!remacct_test.html?arg1=1&arg2=2
/gmref/!remacct_test.html?arg1=2&arg2=1
<Server>webbank2
/gmref/-addacct_doc.html
/gmref/-addacct_test.html?arg1=1,arg2=2
/gmref/-addacct_test.html?arg1=2,arg2=1
/gmref/-baling_doc.html
/gmref/-baling_test.html?arg1=1
```

GenautoAPI Subsystem

It will be recalled that in addition to a need for automatic extraction of links from HTML pages of a web server application provided by the getlinks subsystem 60 of FIG. 6, there was a need for a more efficient manner of using such information and test case data so as to effect an automatic generation of Internet test data which could then be employed to exercise the web server application 32 by means of the webrunner application tool 30 and the webstrain application tool 68. More particularly, an automated mechanism was needed to traverse a large number of web transactions such as the banking transactions under consideration, and to build a cohesive set of HTML/Javascript pages which could test these transactions.

In accordance with this genautoAPI subsystem 80, test cases may accordingly be written for the transactions under considerations such as banking transactions and stored in a definition file to be hereinafter described. This genautoAPI subsystem tool will then execute and create web pages with all of the data required to run the tests, and also will create setup files which may be utilized by the webrunner, webstrain, and other automated tools.

Figure 7:
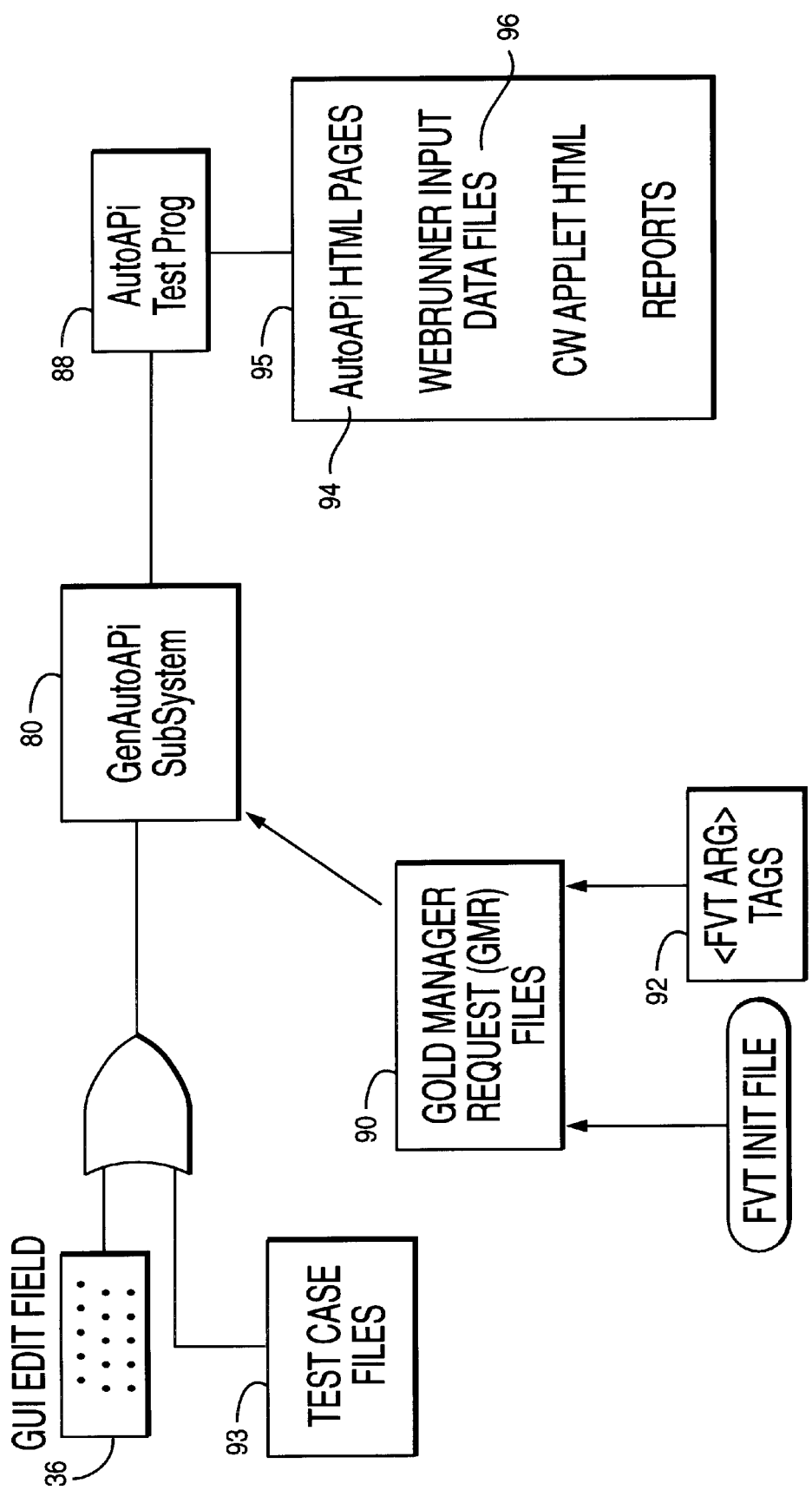
FIG. 7 is a more detailed functional block diagram of the genautoAPI function subsystem of the system depicted in FIG. 2.

Turning now to FIG. 7, depicted therein is a functional block diagram of components of a representative such genautoAPI subsystem. The genautoAPI process 80, FIG. 7, is employed to automatically generate Internet test data and, more particularly, to build an automated set of web pages which permits the system to test all of the web application APIs such as those of banking application 32.

Referring back to FIG. 2, the interface between such HTML pages 82, FIG. 2, and the customizable web server 54 which communicates with the financial institution 64, is for purposes of this disclosure termed a customizable web service (CWS) API 86, FIG. 2. The function of this CWS API 86 is to make every unique data element in a Gold business data definition to be hereinafter described available in its atomic form to the HTML pages 82.

In the banking industry under consideration, the industry has defined a programming standard and set of APIs referred to as the "Gold Message Standard" which defines messages and transactions embodying a standard common complete set of banking functions. Details of this standard may be obtained from the web site URL HTTP// WWW.INTEGRION.COM/GOLD/INDEX.HTML. A relationship further will exist between Javascript objects associated with web application pages, Gold Manager Requests, and Gold Transactions as follows. The execution of Javascript objects will result in Gold manager (GM) requests to a Gold Manager which in turn will manage Gold Transaction messages between the Gold Manager and the financial institution. An autoAPI process 88, FIG. 7, is a Livewire application, provided such that HTML pages may be automatically generated by invoking the genautoAPI subsystem based upon Gold Manager Request files 90 and test cases 92 that may be written by individuals familiar with functional verification test procedures. The autoAPI process 88 permits one to test any transactions such as those associated with the banking application 32 independently of customized pages being available. These Gold Manager Request files 90 will contain functional verification test arguments <FVTArgs>) tags 92, which define test cases 93 for the particular CWS API transaction. The genautoAPI program 80 is essentially an automation tool that builds all of the autoAPI HTML pages 94, webrunner input data 96, and documentation based upon the test data in the Cold Manager Request files 90 and the test files 93 built for CWAPLET testing.

As in the case of the webrunner, webstrainer, and getlink subsystems, a GUI edit field option 36 may be provided for user definition of options from a keyboard. The following is a representative list of such GUI edit field options for the genautoAPI subsystem.

Command Line Options for GenautoAPI

Configuration setting can be found in the FVTInit file.
The following optional parameters will override the defaults.

| Option | Description |
|---|---|
| -s <server> | Override the default server name |
| -b <build> | Override the default build location |
| -h <http/https> | Override the default http/https protocol |
| -p <port> | Override the default port |
| -d <driver> | Override the latest driver name (specify driver) |
| -t <option> | Build tables options can be CNT, GMR, or ALL |
| -c | Override the no copy option (copy latest build) |
| -g | Combine the FVT GMR testcases with the master gmr files |
| -g+ | First restore the original GMR files then combine the FVT GMR testcases with the master gmr files |
| -fast | Run as fast a possible, no statistics, no CWAPLETS, and no WebRunner data generation |
| -runlog | Generate the Runlog file for automated testcase tracking |
| -? | Help information |

The following is the result of a typical run of the genautoAPI subsystem.
Run of GenautoAPI

```
Environment
      Fast Option:              N
      Program Name:             GenAutoAPI
      Program Version[001b]:    1.20
      Run Date/Time:            Thu Jun 26 21:02:07 CDT 1997
      Run By UserId:            drandall
      Run On Machine:           wbank0.pals.austin.ibm.com
Settings
      Installation Option:      Copying d262.15 from master build location
      Server Name:              wbank0.pals.austin.ibm.com
      Server Directory:         /usr/ns-home/https-drandall
      http/https:               http (Non-SSL)
      Port:                     10022
      Build Location:           /afs/austin/u5/psparch/webbank/bld
      Table Options:            Count=N   GMR=N
      Generate Runlog Data:     No
      FVT Directory (base):
/usr/ns-home/https-drandall/cws/docs/fvt/test-suites/au
      FVT LogonFVT LW App:
http://wbank0.pals.austin.ibm.com:10022/logonfvt
      FVT LogonFVT LW Comp:    (base)/mklogweb
      FVT AutoAPI LW App:
http://wbank0.pals.austin.ibm.com:10022/fvtref
      FVT AutoAPI LW Comp:      (base)/mkfvtweb
      FVT CWAPLETS LW App:
http://wbank0.pals.austin.ibm.com:10022/cwaref
      FVT CWAPLETS LW Comp:  (base)/cwaplets/mkcwaweb
      Report File:              (base)/autoapi-report.html
      WebRunner Files:
/usr/ns-home/https-drandall/cws/docs/fvt/test-suites/au
      WebRunner Sleep:      Random (Min=5, Max=20)
      CWAPLETS Sleep:       Random (Min=5, Max=20)
      FVT Copied Gold Loc:  (base)/goldmgr
      Gold Descriptions File:  /tmp/drandall-GenAutoAPI-name.dat
      Gold JSClasses File:     /tmp/drandall-GenAutoAPI-js.dat
      Gold Transactions File:  /tmp/drandall-GenAutoAPI-txn.dat
      Gold Groups File:        /tmp/drandall-GenAutoAPI-group.dat
GMRCombine version 1.20 Details:
   -  I: Combined 949 testcase(s) found in 69 gmr file(s)
Gold Manager Request files (*.gmr) Error Details:
   -  I: No errors found in the Gold Manager Request files (*.gmr)
Gold Manager Request files (*.gmr) Statistics
      Total MQWeb   Tests:          0442
      Total MQWeb   Valid Tests:    0340
      Total MQWeb   Invalid Tests:  0102
      Total CBSF    Tests:          0237
      Total CBSF    Valid Tests:    0191
      Total CBSF    Invalid Tests:  0046
      Total Generic Tests:          0270
      Total Generic Valid Tests:    0002
      Total Generic Invalid Tests:  0268
      Total of ALL  Tests:          0949
      Total of ALL  Valid Tests:    0533
      Total of ALL  Invalid Tests:  0416
      Total of ALL  Errors:         0000
Gold Manager Request files (*.gmr) Counts
      Total Files (*.gmr):     155
      Total Files Ignored:     0
      Total Name Ok:           79
      Total Name Blank:        76
      Total JSClass Ok:        68
      Total JSClass Blank:     87
      Total GoldTxn Ok:        155
      Total GoldTxn Blank:     0
WAMI/PRO Statistics:
      WAMI Statements:    0063
      PRO Statements:     0053
GenCWAPLETS version 1.20 Details:
cwaref Livewire Compile Results:
Livewire Compiler Version 14.4
Copyright © Netscape Communications Corporation 1996
All rights reserved
Reading file
/usr/ns-home/https-drandall/cws/docs/fvt/test-suites/autoapi/goldmg
Compiling file
```

-continued

```
/usr/ns-home/https-drandall/cws/docs/fvt/test-suites/autoapi/gold
Reading file Include_Constants_test.html
Compiling file cwaref.html
Reading file cwaref2.html
Compiling file cwaref2.html
Writing .web file
    -  I: Compile successful of cwaref.web
logonfvt LiveWire Compile Results:
Livewire Compiler Version 14.4
Copyright © Netscape Communications Corporation 1996
All rights reserved
Reading file logonfvt.html
Compiling file logonfvt.html
Compiling file macr_obj.js
Reading file !js_macro_methods.js
Compiling file !js_macro_methods.js
Writing .web file
    -  I: Compile successful of logonfvt.web
fvtref LiveWire Compile Results:
Livewire Compiler Version 14.4
Copyright © Netscape Communications Corporation 1996
All rights reserved
Reading file !ifssobj.js
Compiling file !ifssobj.js
Reading file util.js
Compiling file !gettcat_test_fvt.html
Reading file !gettcalg_test_fvt.html
Compiling file !gettcalg_test_fvt.html
Reading file registerc.html
Compiling file registerc.html
Writing .web file
    -  I: Compile successful of gm.web
IMPORTANT: If the Netscape Enterprise Server is currently running,
you need to restart the following Livewire applications at
http://wbank0.pals.austin.ibm.com:10022/appmgr:
    -  I: FVT LiveWire application cwaref
    -  I: FVT LiveWire application logonfvt
    -  I: FVT LiveWire application fvtref
CheckLiveWire version 1.20 Details:
    -  I: LiveWire configuration file valid
(/usr/ns-home/https-drandall/config/liv
    -  Clean run: 0 warnings, 0 errors, 0 compile problems
Execution Timestamps:
    -  I: Started at Thu Jun 26 21:02:07 CDT 1997
    -  I: Finished at Thu Jun 26 21:15:07 CDT 1997
```

Figure 8:
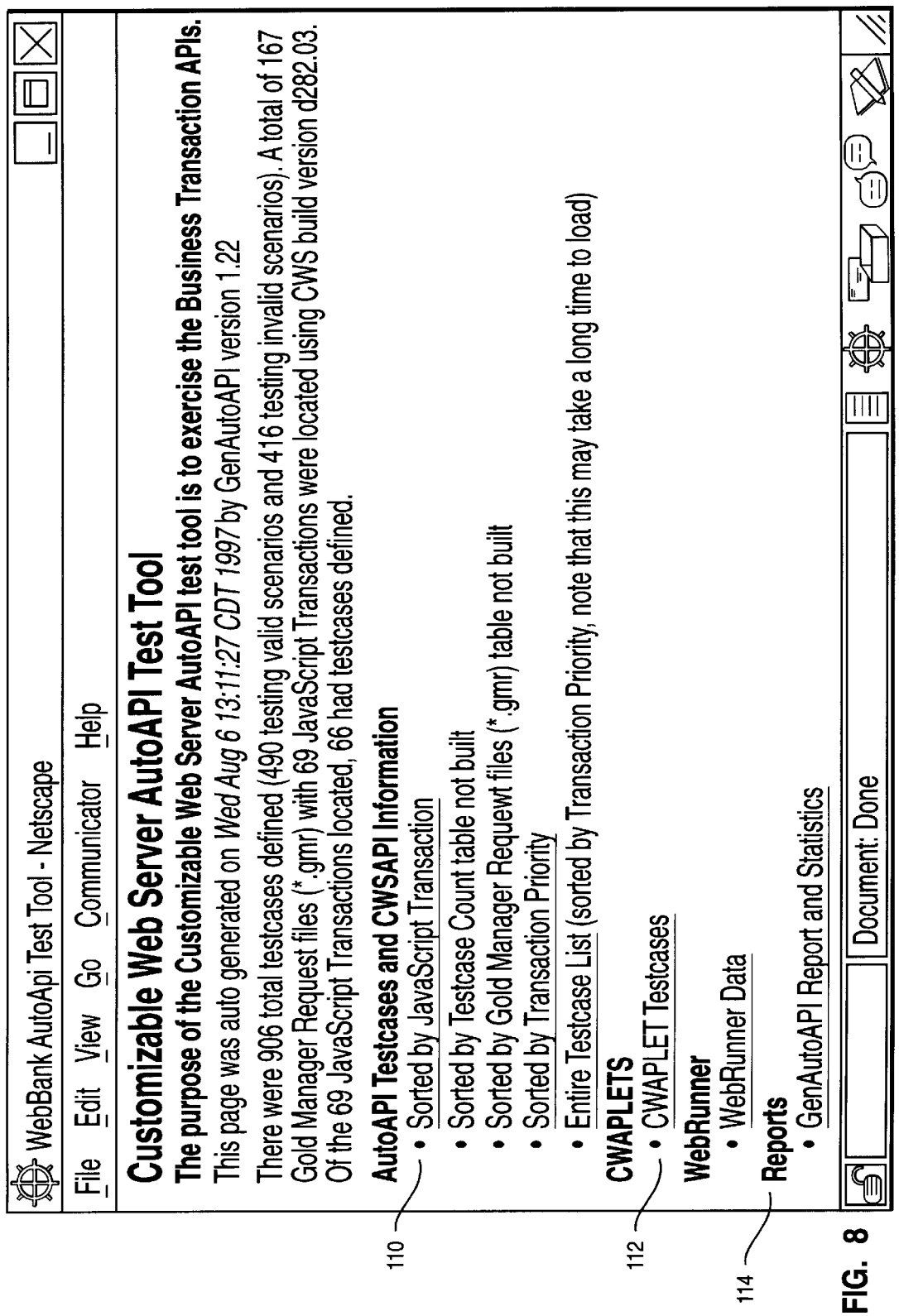
FIG. 8 is a representative user interface screen from the genautoAPI subsystem in the form of a web page depicting the four output components of the autoAPI test subsystem of FIG. 7, including autoAPI test cases, CWAPLET test cases, webrunner data, and reports.
Figure 10A:
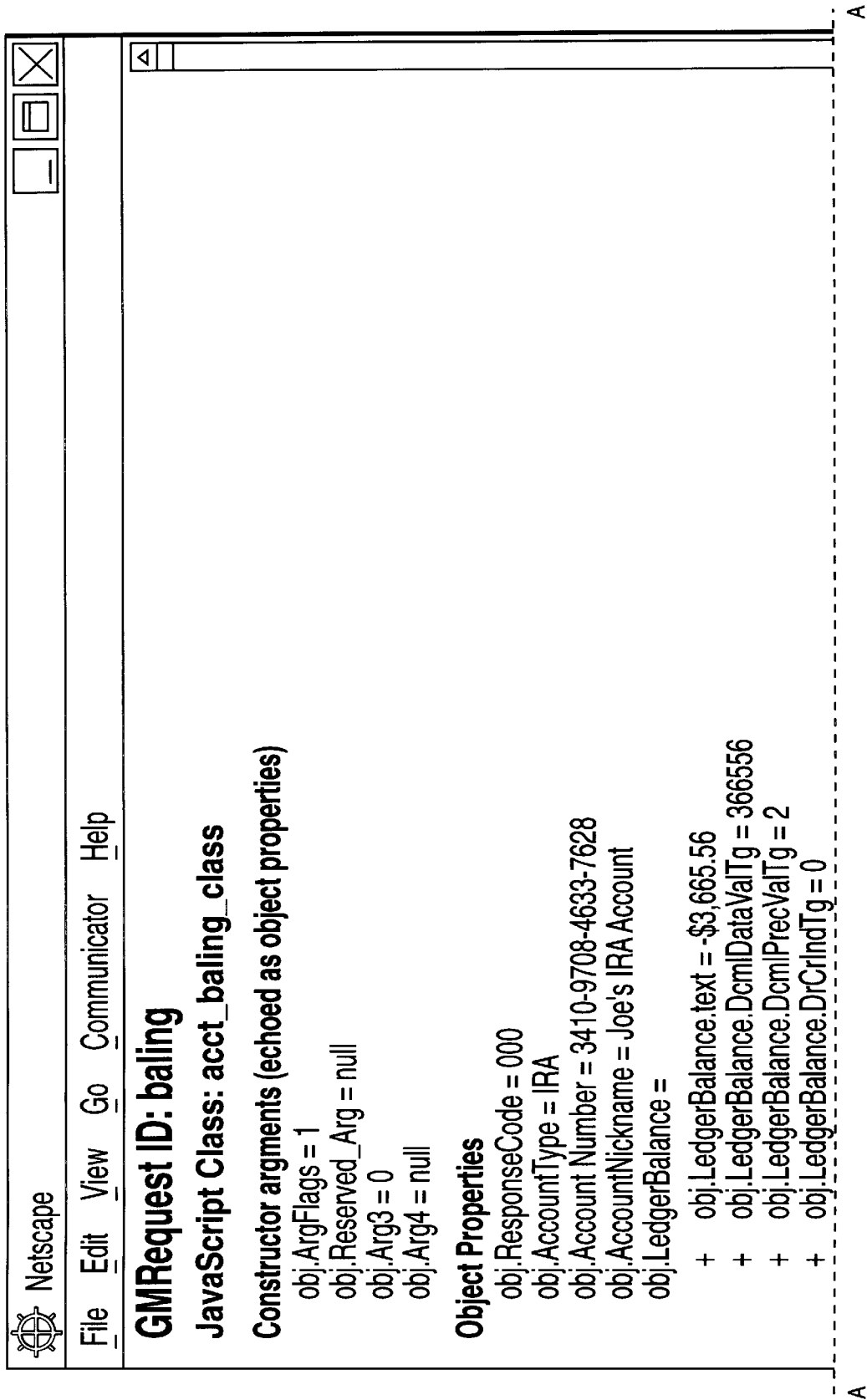
FIGS. 10A and 10B are a representative user interface screen of a balance inquiry (BALINQ) transaction instance of the autoAPI test cases shown in the screen of FIGS. 9A and 9B.
Figure 10B:
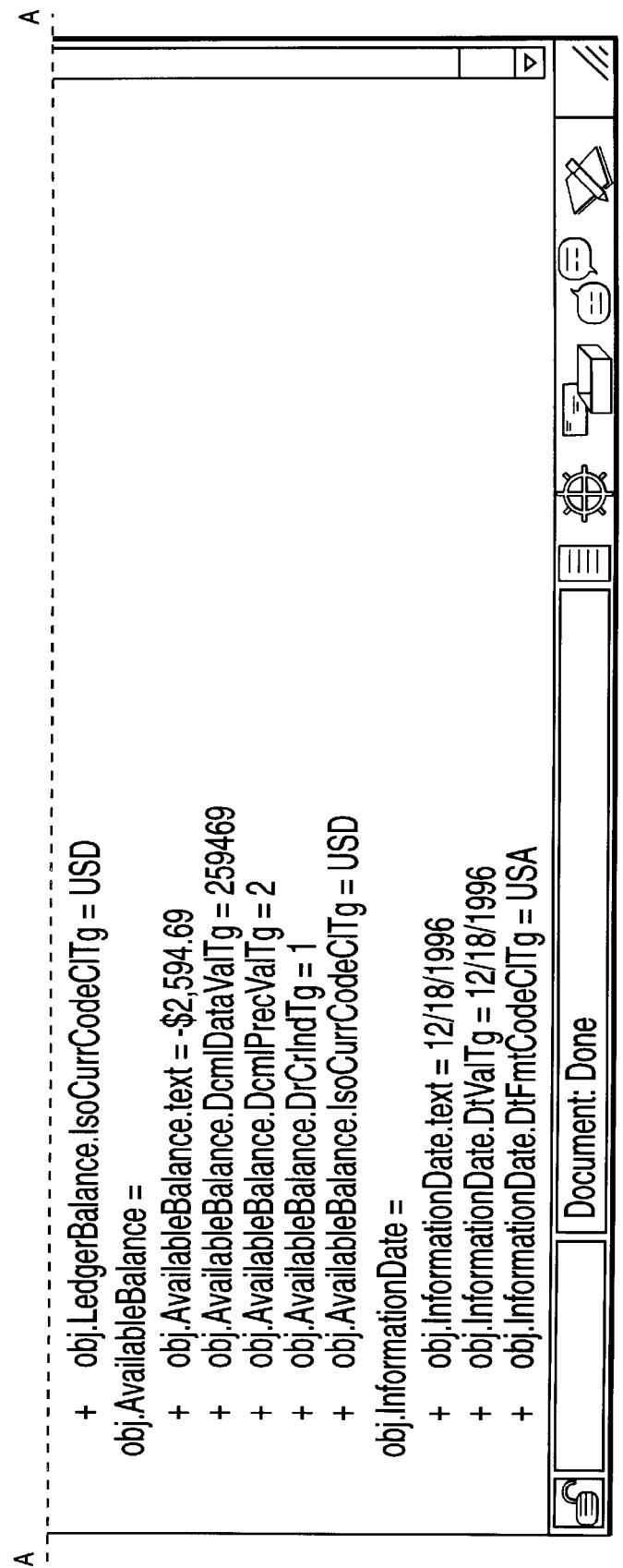

In FIG. 8 there is depicted a representative user interface screen output resulting from execution of the genautoAPI susbystem 80. It will be noted from FIG. 8 that such output will include a listing of autoAPI test cases sorted in various manners, CWAPLET test cases, webrunner data, and genautoAPI reports and statistics.

A representative user interface screen providing a more detailed listing of autoAPI test cases sorted by Javascript transaction, for example (and shown at reference numeral 110 of FIG. 8) may be seen in FIGS. 9A and 9B. A representative user interface screen showing the CWAPLET test cases 112, of FIG. 8, may be seen in greater detail in FIGS. 12A and 12B. Similarly, a user interface screen detailing the reports 114 of genautoAPI, FIG. 8, may be seen in greater detail in FIGS. 14A and 14B.

Figure 11A:
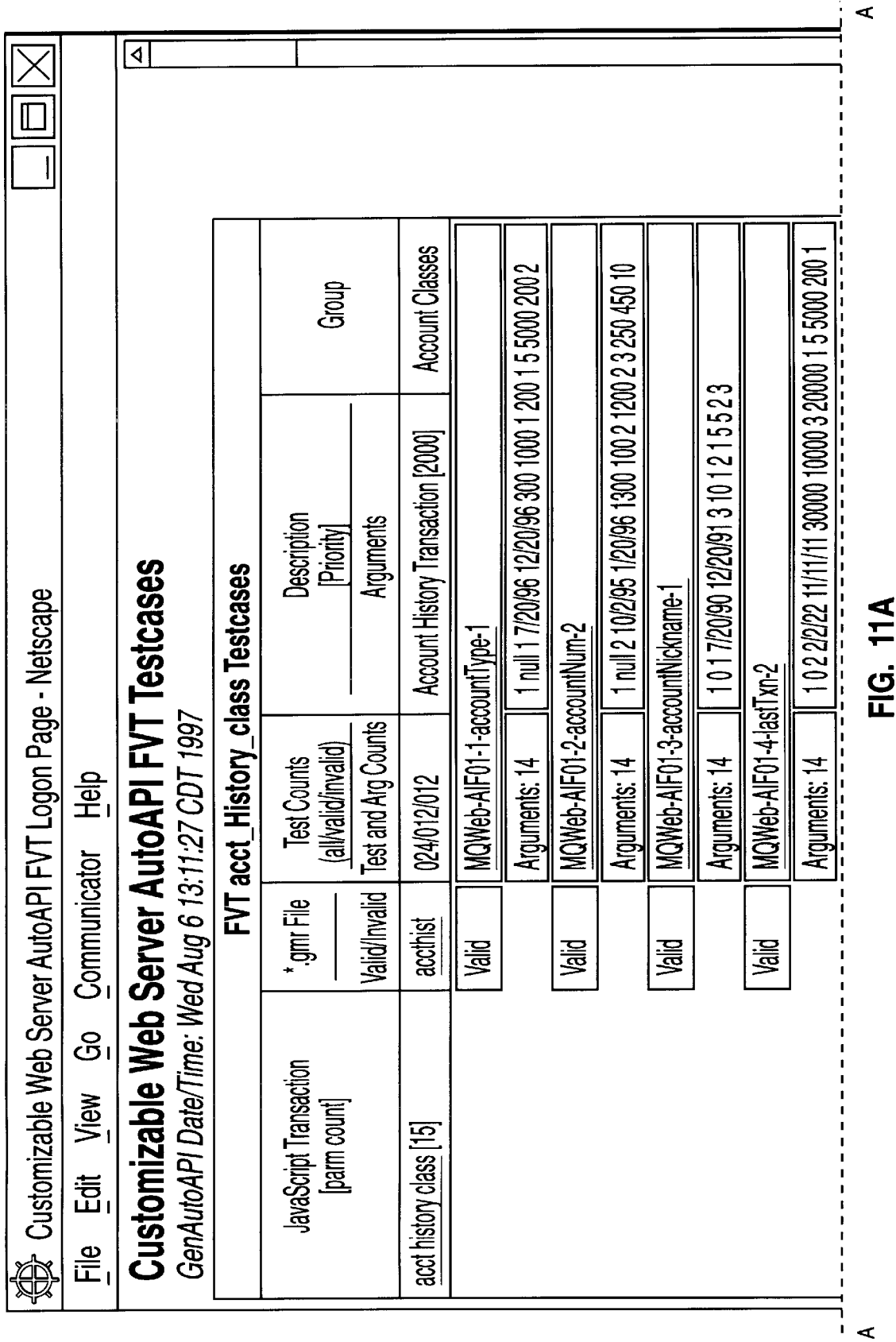
FIGS. 11A and 11B are a similar screen of an account history transaction instance of the autoAPI test cases shown in the screen of FIGS. 9A and 9B.
Figure 11B:
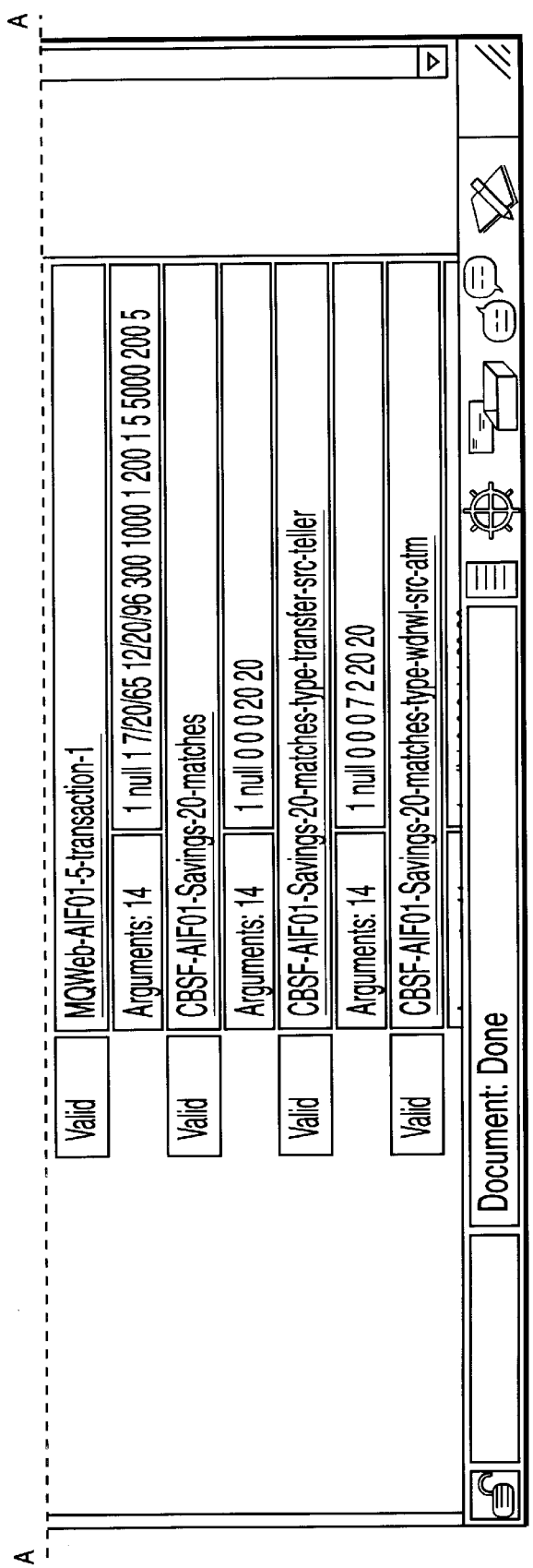

Referring briefly to FIGS. 9A and 9B, which lists representative autoAPI test cases resulting from execution of the genautoAPI subsystem, two representative such test cases have been selected, namely a balance inquiry transaction 116, and an account history transaction 118. Representative user interface screens detailing these balance inquiry and account history transactions, 116 and 118, respectively in FIG. 9A, may be seen in greater detail in the user interface screens of FIGS. 11A and B and 12A and B, respectively.

Figure 12B:
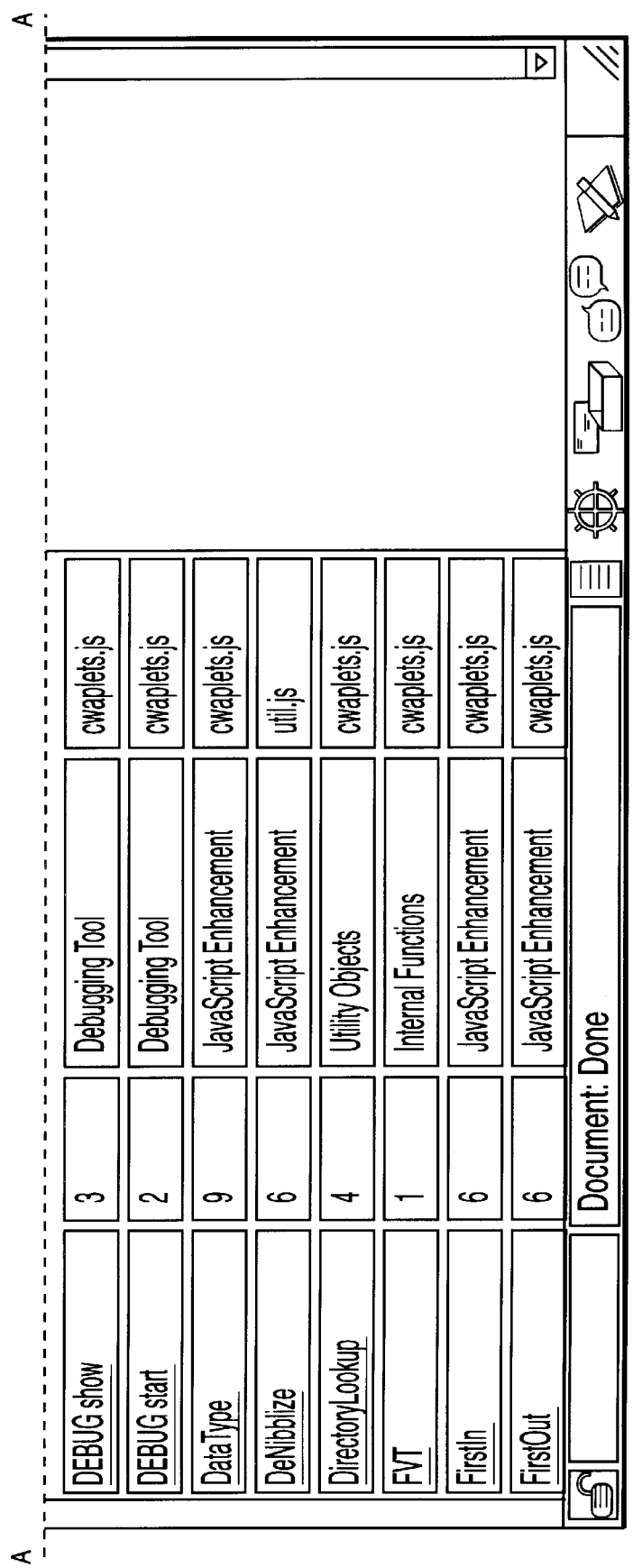
Figure 13A:
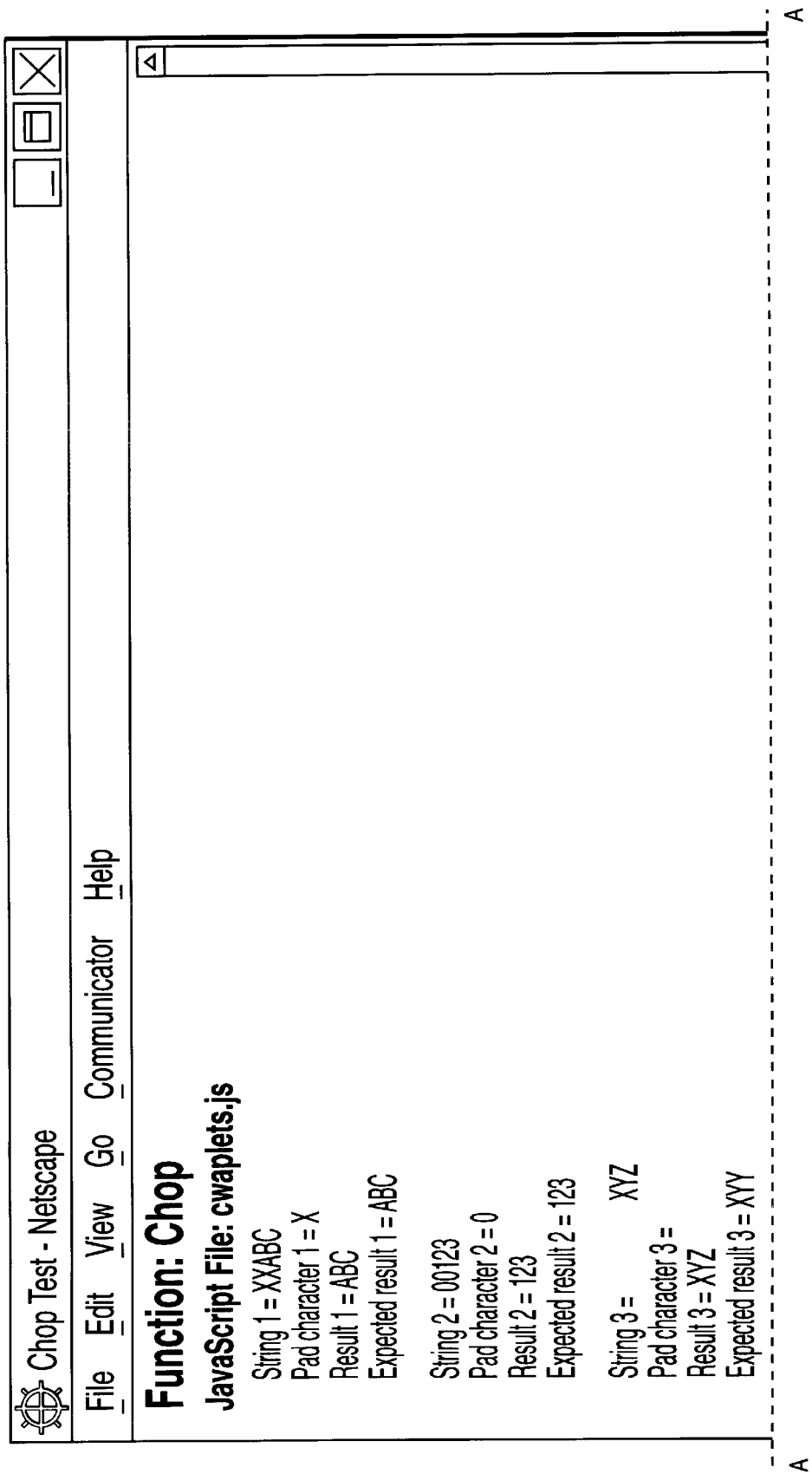
FIGS. 13A and 13B are the Javascript file for one of the test cases "CHOP" depicted in FIGS. 12A and 12B.
Figure 13B:
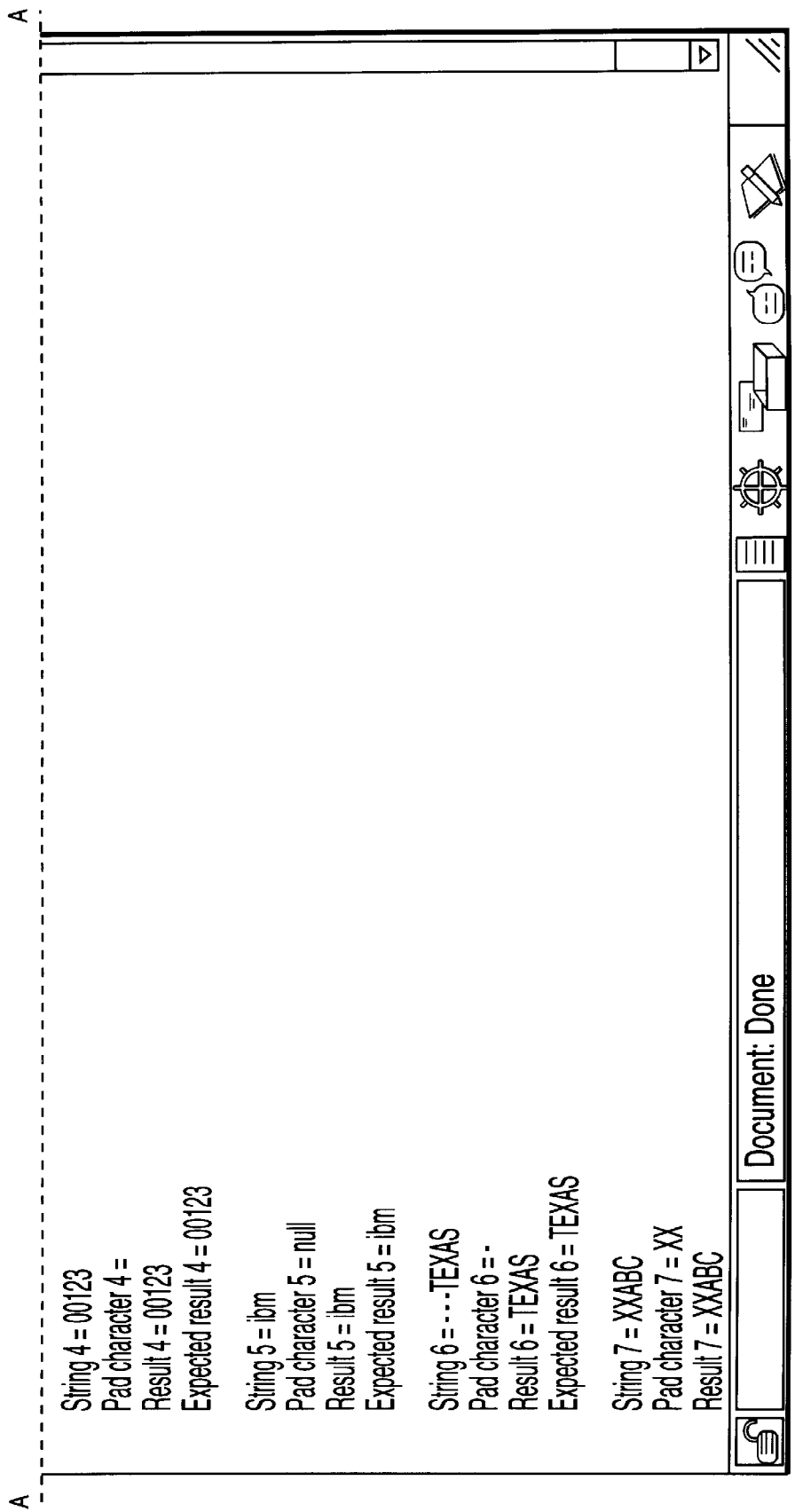

As previously noted, in FIGS. 12A and 12B, a representative user interface screen is depicted therein showing the CWAPLET test cases 112 of FIG. 8. A representative such CWAPLET function, ("Chop", 120) appearing in FIG. 12A, has been selected and a more detailed user interface screen showing such Chop CWAPLET test case, 120, may be seen depicted in the user interface screen in FIGS. 13A and 13B.

Figure 14A:
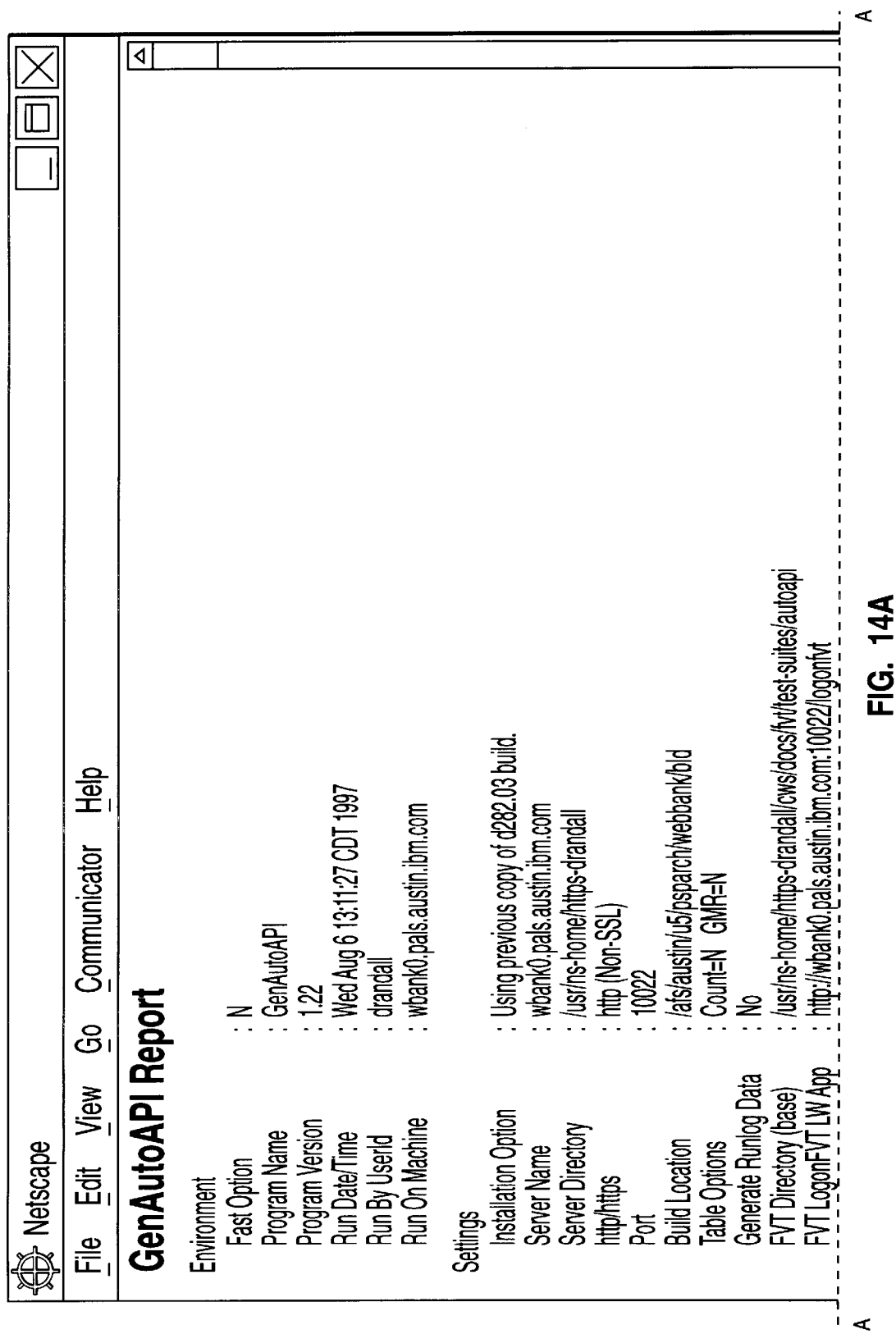
FIGS. 14A and 14B are a representative user interface screen depicting details of the genautoAPI report of FIG. 8.
Figure 14B:
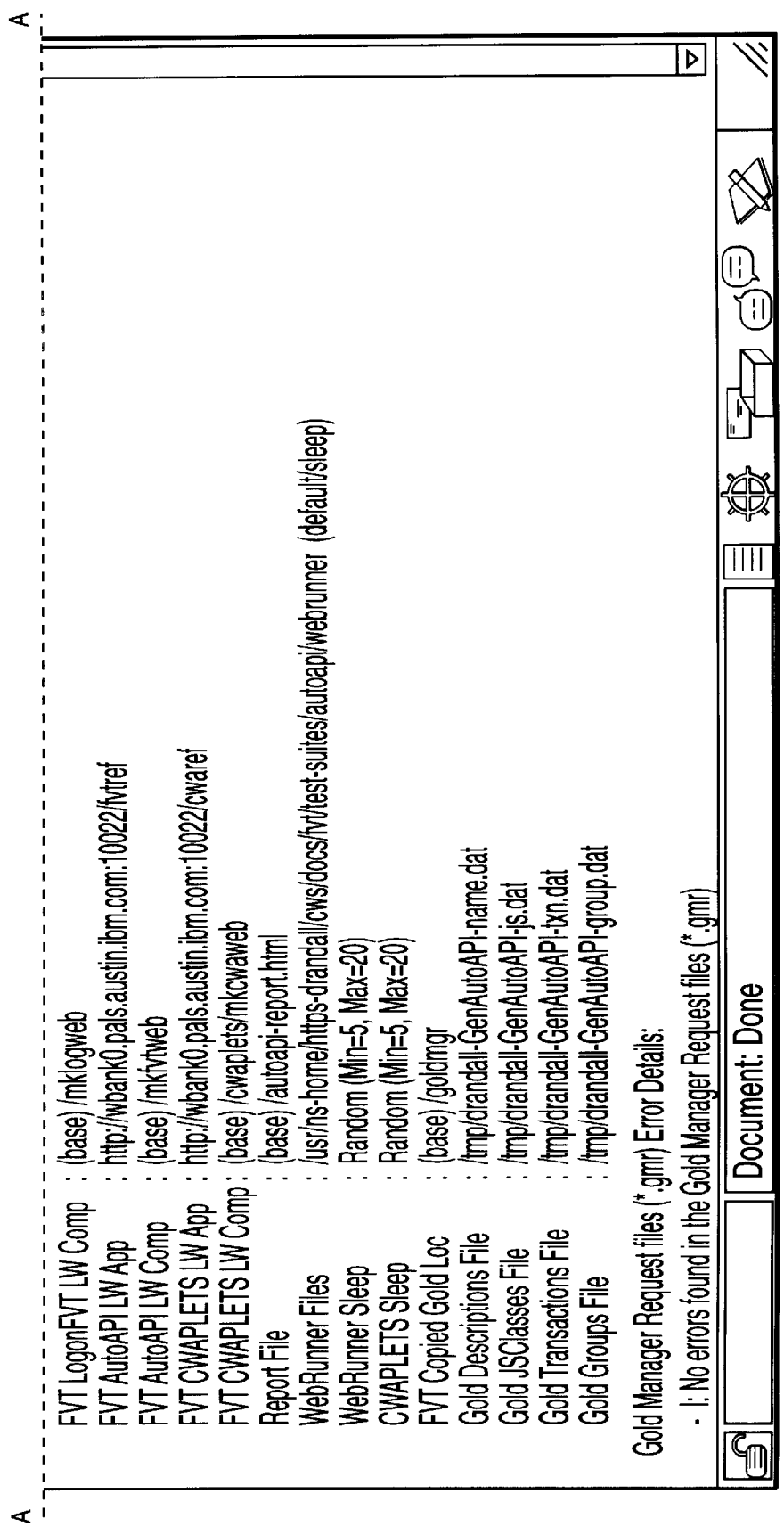

Finally, a representative genautoAPI report 114 of FIG. 8 resulting from the execution of the genautoAPI subsystem, may be seen in greater detail in the representative user interface screen of such genautoAPI report 114 as depicted in FIGS. 14A and 14B.

In summary, this genautoAPI subsystem and program 80 will build documentation and test data for the CWS autoAPI test program 95.

Webstrain Subsystem

Notwithstanding that the getlinks subsystem 60 provides a way to automatically extract URL links from the application 32, and that the genautoAPI subsystem 58 further provides a way to automatically generate necessary Internet test data which may be utilized by the webrunner subsystem for testing and verification of the application 32, it will be recalled from the foregoing discussion that these subsystems alone may not provide for a testing of the application operation in a real world environment wherein the application and server are stressed by multiple hits by a plurality of users within the same timeframe—a phenomenon well known in the art.

A web application and server may be well behaved in a conventional modest test of their capabilities. However, without an ability to stress them in a manner experienced in real life Internet environments, it is all too common to find that such applications and servers crash, behave erratically, and experience problems with data integrity when more robust testing procedures have not been carried out. Accordingly, an ability was needed to stress and exercise the web server and corresponding application by automatically simulating multiple users accessing the server simultaneously. It was further found that it was highly desirable to do so, employing fast non-stop posts and gets (reference numeral 48, FIG. 3) to and from the web server 54. These requirements meant that a conventional Internet browser could not perform these needs and, moreover, even if such a browser was capable of doing so, up to 50 or more manual users/testers would be required to stress the server in a manner which might be experienced in real life conditions.

Figure 15:
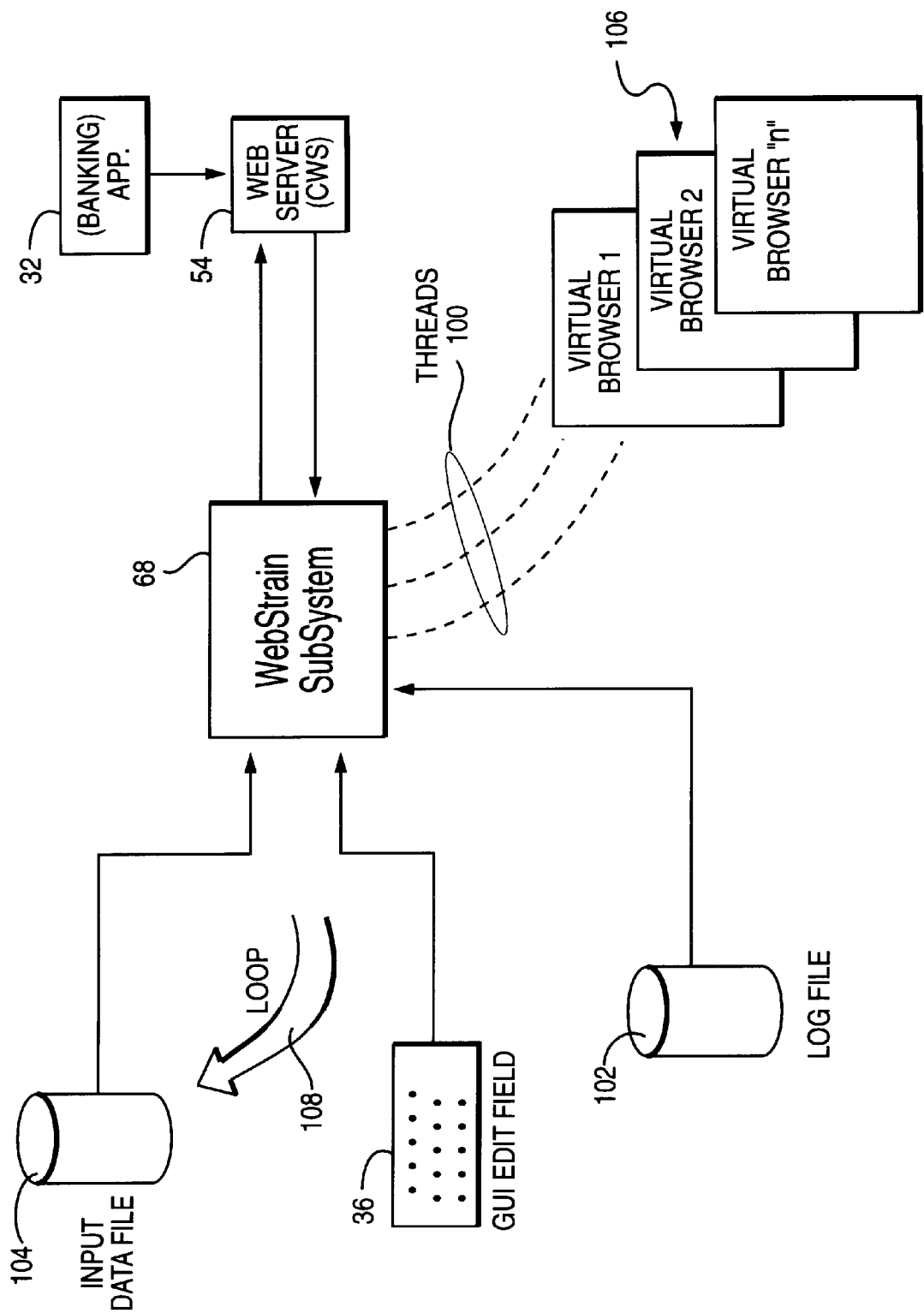
FIG. 15 is a more detailed functional block diagram overview of the webstrain subsystem of the system depicted in FIG. 2.

Accordingly, the subject webstrain application subsystem has been provided, which is essentially an automated client-based web server stress tool. A functional block diagram overview of such a subsystem may be seen depicted in FIG. 15 which is employed to start multiple user-defined threads 100, each of which is in itself a virtual browser 106 in the manner of the webrunner application 30. These individual virtual browsers 106 get and post data, 48 of FIG. 3, to the server 54 under test at a rapid rate. The time of each transaction and the result (e.g., requested page found and returned) is logged in an appropriate log file 102. The actual returned data in the case of the webstrain subsystem, unlike with the webrunner application, is not saved, as the purpose of this webstrain application is to stress and strain the server 54 executing the application 32. This is to be contrasted with the webrunner subsystem, whose purpose in part is to store, examine, and compare returned data (in the data storage 40).

In the implementation of the webstrain subsystem under consideration, it was highly desirable to provide for a flexible subsystem. Accordingly, the webstrain subsystem in the implementation herein described, permits users to specify the particular server 54 and port in an input data file 104, and also to allow selected items in the data file to be overridden as desired by the user/tester through the user of GUI edit field options 36, similarly as in the case of the previously described other subsystems. A repeat option permits the webstrain subsystem to loop, shown schematically as loop 108, through the input file 104 data as many times as specified, including an option to repeat indefinitely. Sleep values may further be specified to slow down requests to simulate the delay associated with actual real-life users if desired. Still further, a wait option is provided, creating a semaphore which causes all of the threads 100 to wait on the semaphore until all of the threads are created. Once created, these threads 100 begin execution simultaneously so as to simulate a severe hit on the server. This option moreover may be disabled, allowing the threads to begin execution as soon as they are created, for a staggered approach so as to more accurately simulate yet another mode in which such a server 54 may be stressed in real life environments.

Still a further significant feature and benefit of the webstrain subsystem is that the input data files 104 are intentionally designed and defined so as to be shared and common with the data files 34 (FIG. 3) employed by the webrunner subsystem, thereby providing a more efficient web testing and verification system. It is significant that due to the functionality provided by the aforementioned webstrain subsystem, the subsystem is fully automated and may run without user intervention, thereby freeing testers up to perform other duties and reducing the chances of human error. Also, as previously noted, without these features, testing which could more accurately reflect real life conditions would entail use the undesirable use of a large number of testers to duplicate the number of requests per minute if conventional browsers were employed.

An illustration of the previously noted options 36 for the webstrain subsystem which may be user-specified in the GUI edit field will be seen as follows in FIG. 4.

An example of the previously noted input data file for the webstrain subsystem is as follows:

Input Data File for Webstrain

```
<Server>wbank1.pals.austin.ibm.com
<Port>10005
# WebRunner/WebStrain data generated by GenAutoAPI Version 1.10 on
Thu Jun 12 11:03:41 CDT 1997
# Data is for MQWeb Valid/Invalid testcases
/logon/
<Prereq>POST:/proclogin.ns:UserID=AIF01&Pin=PIN01&Password=
PASSWD01&PageGood=/fvtref/registerc.html
/fvtref/!addpayee_test_fvt.html?arg1=1&arg2=null&arg3=907&arg4=
915&arg5=908&arg6=round
<Sleep>10
/fvtref/!addpayee_test_fvt.html?arg1=1&arg2=null&arg3=908&arg4=
9&arg5=98&arg6=Austin&a
<Sleep>10
/fvtref/!addpayee_test_fvt.html?arg1=1&arg2=null&arg3=909&arg4=
95&arg5=900&arg6=BocaRa
<Sleep>10
/fvtref/!addpayee_test_fvt.html?arg1=1&arg2=null&arg3=1107&arg4=
9150&arg5=9080&arg6=ro
<Sleep>10
/fvtref/!addpayee_test_fvt.html?arg1=1&arg2=null&arg3=7&arg4=
15&arg5=8&arg6=karachi&ar
<Sleep>10
/fvtref/!chgpayee_test_fvt.html?arg1=1&arg2=null&arg3=1&arg4=
1&arg5=2&arg6=2&arg7=1&ar
<Sleep>10
/fvtref/!chgpayee_test_fvt.html?arg1=1&arg2=null&arg3=2&arg4=
2&arg5=2&arg6=2&arg7=2&ar
<Sleep>10
/fvtref/!chgpayee_test_fvt.html?arg1=1&arg2=0&arg3=1&arg4=1&arg5=
1&arg6=1&arg7=1&arg8=
<Sleep>10
/fvtref/!chgpayee_test_fvt.html?arg1=1&arg2=0&arg3=1&arg4=1&arg5=
2&arg6=2&arg7=1&arg8=
<Sleep>10
/fvtref/!chgpayee_test_fvt.html?arg1=1&arg2=null&arg3=1&arg4=
1&arg5=2&arg6=2&arg7=1&ar
<Sleep>10
/fvtref/!delpayee_test_fvt.html?arg1=1&arg2=null&arg3=null&arg4=null
<Sleep>10
/fvtref/!delpayee_test_fvt.html?arg1=1&arg2=null&arg3=1&arg4=1
<Sleep>10
/fvtref/!delpayee_test_fvt.html?arg1=1&arg2=0&arg3=0&arg4=1
<Sleep>10
/fvtref/!delpayee_test_fvt.html?arg1=1&arg2=null&arg3=2&arg4=3
<Sleep>10
/fvtref/!delpayee_test_fvt.html?arg1=1&arg2=0&arg3=0&arg4=2
<Sleep>10
/fvtref/!delpayee_test_fvt.html?arg1=1&arg2=null&arg3=4&arg4=5
<Sleep>10
```

-continued

```
/fvtref/!delpayee_test_fvt.html?arg1=1&arg2=0&arg3=0&arg4=0
<Sleep>10
/proclogoff.ns
<Sleep>10
/logon/exit.html?Status_Code=0
```

An excerpted example of the previously noted log file 102 is as follows.

Log File of Webstrain

```
TESTLOG Version 3.14.00 (10 Jun 1996), OS/2 Version 2.30
© Copyright IBM Corporation 1994, 1996.
WBSTRAIN( 5CA) starting at 10:03:58.47 on 06/27/1997
WBSTRAIN( 5CA    1)-0000 0000 7| Overriding Server, now
wbank1.pals.austin.ibm.com
was wbank1.pals.austin.ibm.com
WBSTRAIN( 5CA    1)-0000 0000 7| overriding Server Port, now 10005,
was 80
WBSTRAIN( 5CA    2)-0000 0000 7| Thread \SEM32\00 - URL = /logon/
WBSTRAIN( 5CA    3)-0000 0000 7| Thread \SEM32\01 - URL = /logon/
WBSTRAIN( 5CA    4)-0000 0000 7| Thread \SEM32\02 - URL = /logon/
WBSTRAIN( 5CA    5)-0000 0000 7| Thread \SEM32\03 - URL = /logon/
WBSTRAIN( 5CA    2)-0000 0000 9| Thread \SEM32\00 SENDING:
GET /logon/ HTTP/1.0
Connection: Keep-Alive
User-Agent: Webstrain /1.61 (OS/2)
Accept: image/gif, image/x-xbitmap, image/jpeg, image/pjpeg, */*
WBSTRAIN( 5CA    3)-0000 0000 9| Thread \SEM32\01 SENDING:
GET /logon/ HTTP/1.0
Connection: Keep-Alive
User-Agent: Webstrain /1.61 (OS/2)
Accept: image/gif, image/x-xbitmap, image/jpeg, image/pjpeg, */*
WBSTRAIN(STARTING )-0000 0000 5| Thread \SEM32\00 - Starting
Variation 1
WBSTRAIN( 5CA    3)-0000 0000 5|
WBSTRAIN(STARTING ) -0000 0000 5| Thread \SEM32\01 - Starting
Variation 2
WBSTRAIN( 5CA    4)-0000 0000 5|
WBSTRAIN(STARTING ) -0000 0000 5| Thread \SEM32\02 - Starting
Variation 3
WBSTRAIN( 5CA    5) -0000 0000 5|
WBSTRAIN(STARTING )-0000 0000 5| Thread \SEM32\03 - Starting
Variation 4
WBSTRAIN( 5CA    6)-0000 0000 5|
WBSTRAIN(PASS+++++) -0000 0000 5| Thread \SEM32\07 - PASS: Variation
2098
WBSTRAIN( 5CA    B)-0000 0000 9| Thread \SEM32\09 - Done Receive 1566
bytes
WBSTRAIN( 5CA    A)-0000 0000 9| Thread \SEM32\08 - Done Receive 1566
bytes
WBSTRAIN( 5CA    B)-0000 0000 5|
WBSTRAIN(PASS+++++) -0000 0000 5| Thread \SEM32\09 - PASS: Variation
2099
WBSTRAIN( 5CA    A) -0000 0000 5|
WBSTRAIN(PASS+++++)-0000 0000 5| Thread \SEM32\08 - PASS: Variation
2100
WBSTRAIN( 5CA    1)-0000 0000 5| Thread:\SEM32\00 Bytes Recd: 357330,
Elapsed Time: 2013 (seconds)
WBSTRAIN( 5CA    1)-0000 0000 5| Thread:\SEM32\01 Bytes Recd: 357330,
Elapsed Time: 2014 (seconds)
WBSTRAIN( 5CA    1)-0000 0000 5| Thread:\SEM32\02 Bytes Recd: 357330,
Elapsed Time: 2013 (seconds)
WBSTRAIN( 5CA    1)-0000 0000 5| Thread:\SEM32\03 Bytes Recd: 357330,
Elapsed Time: 2016 (seconds)
WBSTRAIN( 5CA    1)-0000 0000 5| Thread:\SEM32\04 Bytes Recd: 357330,
Elapsed Time: 2017 (seconds)
WBSTRAIN( 5CA    1)-0000 0000 5| Thread:\SEM32\05 Bytes Recd: 357330,
Elapsed Time: 2015 (seconds)
WBSTRAIN( 5CA    1)-0000 0000 5| Thread:\SEM32\06 Bytes Recd: 357330,
Elapsed Time: 2016 (seconds)
WBSTRAIN( 5CA    1)-0000 0000 5| Thread:\SEM32\07 Bytes Recd: 357330,
Elapsed Time: 2017 (seconds)
WBSTRAIN( 5CA    1)-0000 0000 5| Thread:\SEM32\08 Bytes Recd: 357330,
Elapsed Time: 2017 (seconds)
WBSTRAIN( 5CA    1)-0000 0000 5| Thread:\SEM32\09 Bytes Recd: 357330,
Elapsed Time: 2017 (seconds)
```

-continued

```
WBSTRAIN( 5CA    1)-0000 0000 5| Total Bytes Recd =3573300
WBSTRAIN( 5CA    1)-0000 0000 5| Total Time =2018 (seconds)
WBSTRAIN( 5CA    1)-0000 0000 5| Server Output = 1770 bytes per
second
WBSTRAIN( 5CA    1)-0000 0000 5|
STATUS Variation Run: 2100, Pass: 2100, Fail 0
Success = 1
WBSTRAIN( 5CA)                  | WBSTRAIN.EXE done
WBSTRAIN( 5CA) stopping at 10:37:39.10 on 06/27/1997
The above output file demonstrates 10 threads running, each thread
receiving 357,330 bytes, total 3,573,300, with a total time of 2018
seconds. 2100 test variations (transactions) were performed, all
requested data were returned without errors.
```

Figure 16A:
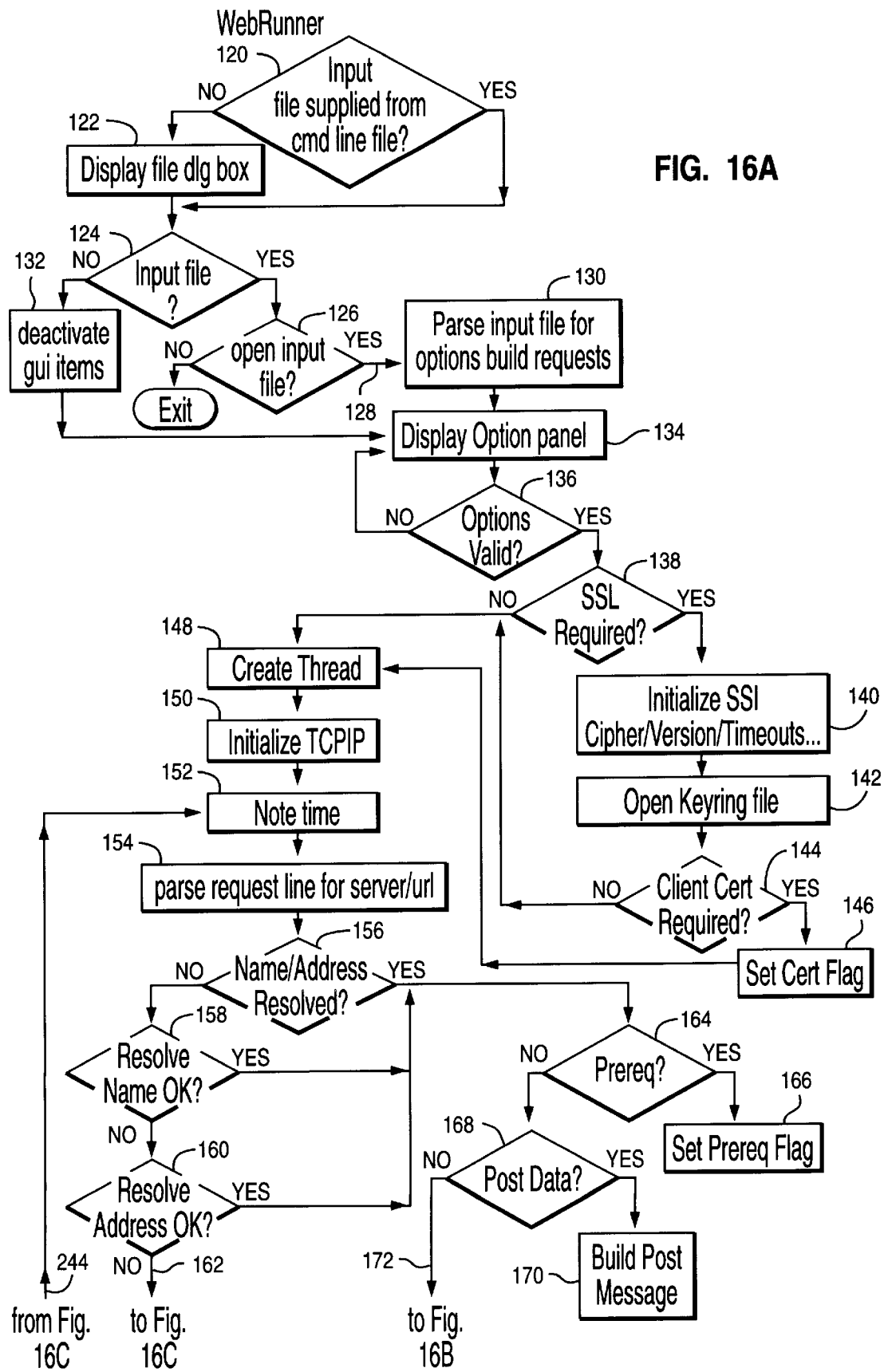
FIGS. 16A–16C is a flow diagram illustrating the sequence of operation of the webrunner subsystem depicted in FIG. 2.

Now that an overview has been provided of the operation of the webrunner, getlinks, genautoAPI, and webstrain subsystems, a more detailed description of the sequence of operation of each subsystem will hereinafter be provided with reference to FIGS. 16A–16 C, 17A–17B, 18, and 19A–19B, respectively.

Turning now to the description of the flow diagram for the webrunner subsystem illustrated in FIGS. 16A–16C, first a query will be made of whether an input file has been supplied from a command line, e.g., a user-specified GUI field, 120. If not, a display file dialog box is displayed, 122. If the input file has been supplied in response to a query, 124, it is determined whether or not to open the input file, 126. If not, the process is exited but if the input file is opened, as indicated by path 128, the input file is parsed for options and build requests 130 and flow continues to block 134. If it is not an input file as determined by query 124, GUI items are deactivated, 132, and an option panel is displayed, 134. A query is next made of whether selected options are valid, 136. If not, the process loops back to block 134. If yes, it is determined whether SSL is required, 138. If yes, SSI cipher/version timeouts are initialized, 140, a keyring file is opened 142, followed by a query of whether client certification is required, 144. If certification is not required, the process exits to the left of the decision box 144. If certification is required, a certification flag is set, 146.

If either SSL is not required, as determined at box 138, or the certification flag is set, 146, or no certification is required, a thread is thereby created 148, the TCPIP connection is initialized, 150, time is noted, 152, and the request line is parsed for the desired server/URL 154. In response to a query of whether the name/address has been resolved, 156, if not, the process exits to the right and a query is made of whether the name has been resolved, 158. If not, a query is made of whether the address has been resolved, 160. If neither the name or address have been resolved, the process exits to the right along path 162 to FIG. 16C. If the name/address has already been resolved as determined at block 156 or the name has been resolved at 158, or address resolved at 160, the process continues to block 164 to determine whether any prerequisites are required, 164. If so, a prerequisite flag is set, 166. If not, a query is made of whether post data is required, 168. If so, a build post message is displayed, 170. If not, the process exits along path 172 to FIG. 16B and a determination is made of whether a parameter replacement option is set, 174 (top of FIG. 16B). If set, stored data associated with the parameter is retrieved, 176. Next, a query is made of whether a sleep time has been specified, 178. If so, the process sleeps for the specified amount of time, 180. Upon completion of the sleep time or if the sleep option has not been set, a query is next made of whether the WAMI option has been set, 182. If yes, the WAMI flag is set, 184.

Figure 16B:
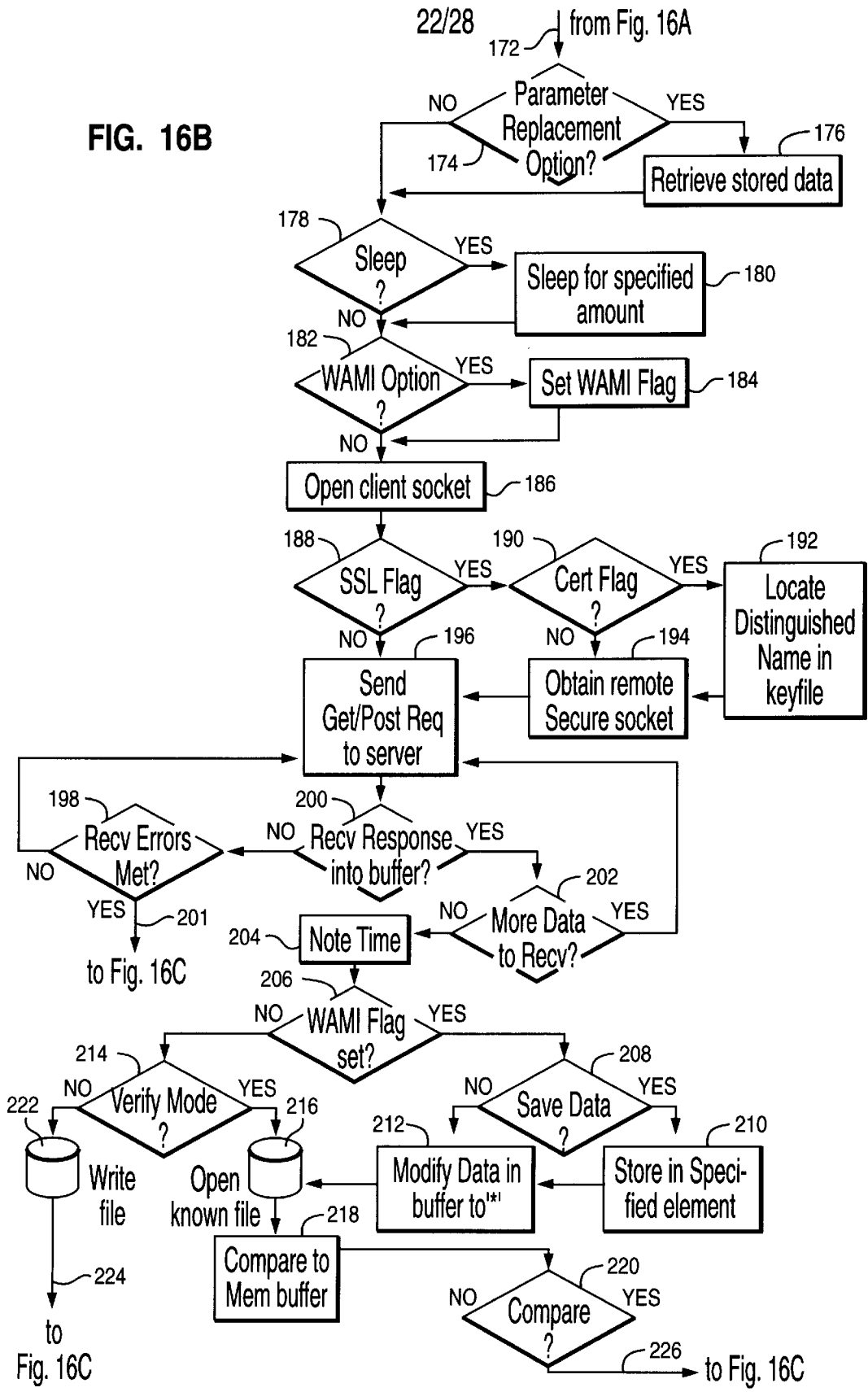

Continuing with FIG. 16B, if the WAMI option has not been specified at block 182 or the WAMI flag set at block 184, a client socket is next opened 186. An SSL flag query is then made, 188. If the SSL flag has previously been set as determined at decision block 188, a query is made of whether the certification flag was set at 146, as determined at block 190. If the flag has been set, a distinguished name in a keyfile is located, 192, and a remote secure socket obtained at 194. This socket is also obtained if the response to the certification flag query 190 is negative.

Next, a get/post request is sent to the server if the SSL flag has not been set, 188 or the remote secure socket has been obtained, 194, this sending of the get/post request being depicted at 196. Next, a determination is made at decision block 200 of whether a receive response is in the buffer. If not, a query is made of whether receive errors have been met 198. If yes, the process exits at path 201 to FIG. 16C. If not, the process loops back to block 196, whereupon a next get/post request is sent to the server. If, in response to the receive response into buffer request 200, the result is affirmative, a query is made of whether more data is to be received, 202. If yes, the process loops back to block 196 to send additional get/post requests. If no more data is to be received, the process exits decision block 202 and the time is noted at 204, whereupon a query is made of whether the WAMI flag is set, 206. If set, a query is then made of whether data is to be saved, 208. If yes, data is stored in a specified element, 210. Data in a buffer is modified to a generic "*" 212, if data is not to be saved or after it has been stored per block 210 in a specified element. This modification of data is shown at block 212.

Continuing with FIG. 16B, if in response to the WAMI flag set query 206, no such flag has been detected, a query is made of whether the system is in the verify mode, 214. If so, or after modification of data 212, a known file is opened 216, compared to the memory buffer 218, and a query is made of whether there is a match between the thus-opened file and the memory buffer at 220. If the verify mode is not set as determined at block 214, the file is written, 222, and the process continues along path 224.

Figure 16C:
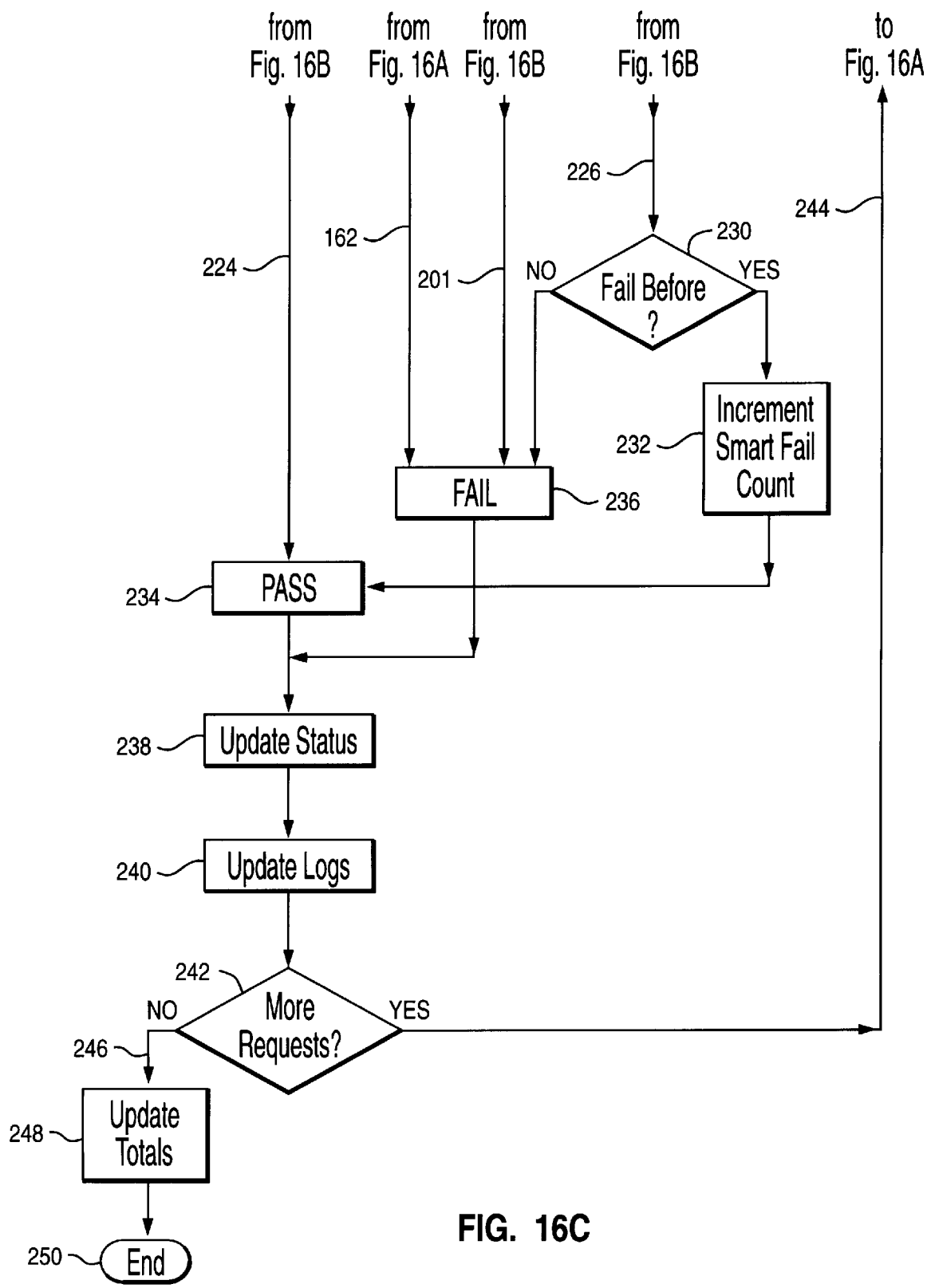

Turning to FIG. 16C, a query is then made of whether a failure of the comparison has been made before, 230. If so, a smart/fail count is incremented, 232, and flow continues to the pass block 234. If a failure has not occurred before, the process exits to the left of decision block 230 to fail block 236. The process is in a pass state, 234, in response to flow along path 224 or, as just described, if the smart/fail count has been incremented at 232, in which case the status is updated, 238, the logs are updated, 240, and a query is made of whether more requests for gets/posts are present, 242. If more requests are present, the process exits to the left of the decision box 242 along path 244.

The process is in a fail state as shown at block 236 if the process has proceeded along path 162 from FIG. 16C (e.g., neither the name or address have been resolved), if there has been no previous failure as determined at block 230, or if receive errors have been met and the process is flowing along path 201. In this fail state, flow continues out of the fail block 236 to again update status, 238, update logs 240, and query if more requests are present at 242. If so, the process exits as previously described along path 244 to return to block 152 of FIG. 16A. If no more requests are present, the process exits, 246, totals are updated, 248, and the process ends, 250.

Figure 17A:
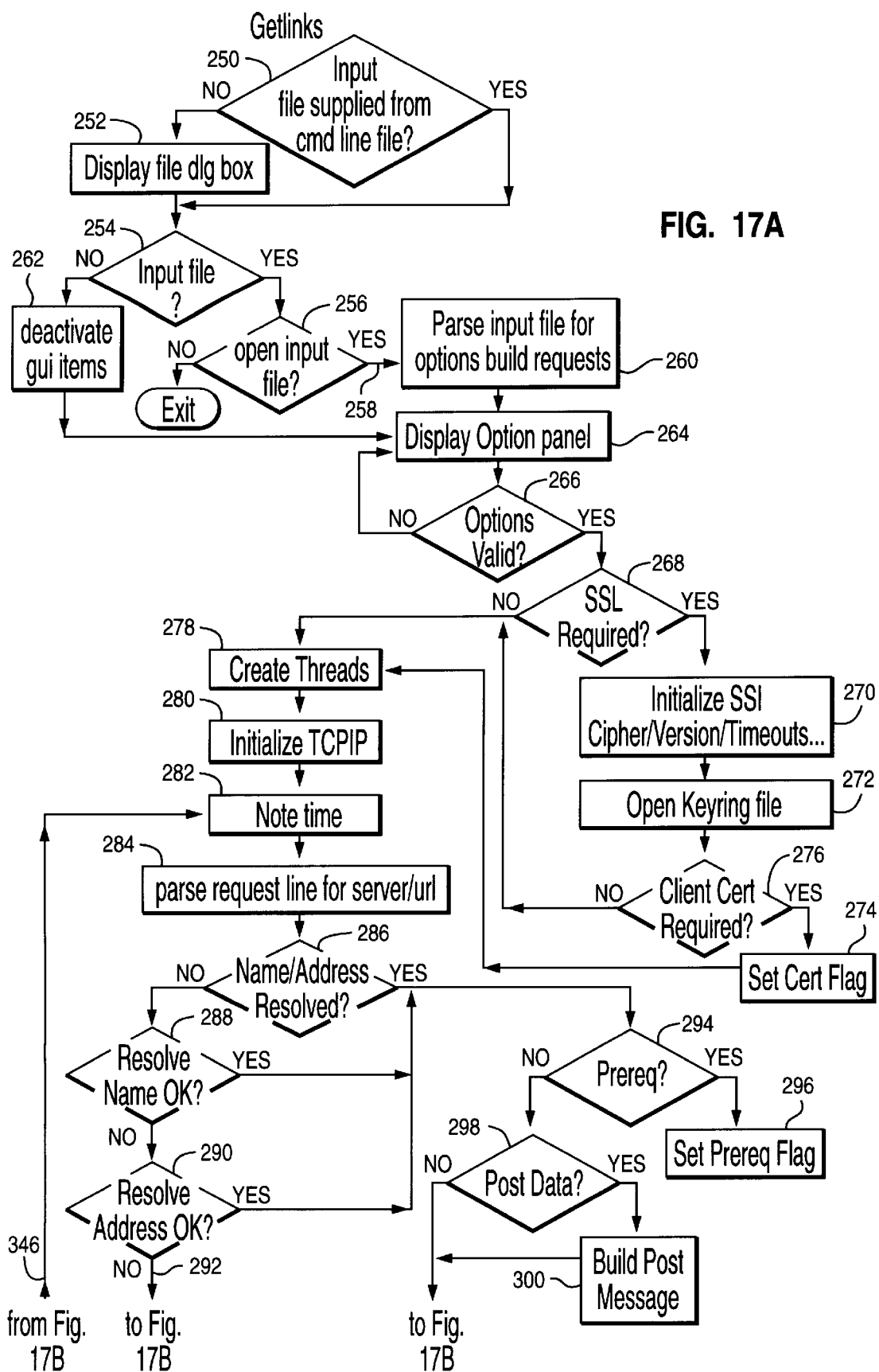
FIGS. 17A–17B is a flow diagram illustrating the sequence of operation of the getlinks subsystem depicted in FIG. 2.

Turning now to FIG. 17A, depicted therein is the subsystem flow for the getlinks subsystem. It will be noted that through the sleep decision box 178 in the webrunner subsystem of FIG. 16B, the flow for the getlinks subsystem of FIG. 17A is essentially identical.

First a query will be made of whether an input file has been supplied from a command line, e.g., a user-specified GUI field, 250. If not, a file dialog box is displayed, 252. If the input file has been supplied in response to a query of whether an input file is selected, 254, if yes, it is determined whether or not to open the input file, 256. If not, the process is exited but if the input file is opened, as indicated by path 258, the input file is parsed for options and build requests 260. If it is not an input file as determined by query 254, GUI items are deactivated, 262, and an option panel is displayed, 264. If the panel is displayed, a query is made of whether options are valid, 266. If so, it is determined whether SSL is required, 268. If so, SSI cipher/version timeouts are initialized, 270, a keyring file is opened 272, followed by a query of whether client certification is required, 276. If not, the process exits to the left of the decision box 276. If certification is required, a certification flag is set, 274. If either SSL is not required, as determined at box 268, or the certification flag is set, 274, threads are thereby created 278, the TCPIP connection is initialized, 280, time is noted, 282, and the request line is parsed for the server/URL 284. In response to a query of whether the name/address has been resolved, 286, if not, the process exits to the right and a query is made of whether the name has been resolved, 288. If not, a query is made of whether the address has been resolved, 290. If neither the name or address have been resolved, the process exits to the right along path 292 to FIG. 17B. If the name/address has already been resolved as determined at block 294 or the name has been resolved at 288, or address resolved at 290, the process continues to block 294 to determine whether any prerequisites are required. If so, a prerequisite flag is set, 296. If not, a query is made of whether post data is required, 298. If so, a build post message is displayed, 300 and the process continues along 303 to FIG. 17B. If not, the process exits below block 298 along line 303 to FIG. 17B and a determination is made of whether a parameter replacement option is set, 302. If set, stored data associated with the parameter is retrieved, 304. Next, a query is made of whether a sleep time has been specified, 306. If so, the process sleeps for the specified amount of time, 308 and the process continues along path 310 of FIG. 17B.

Figure 17B:
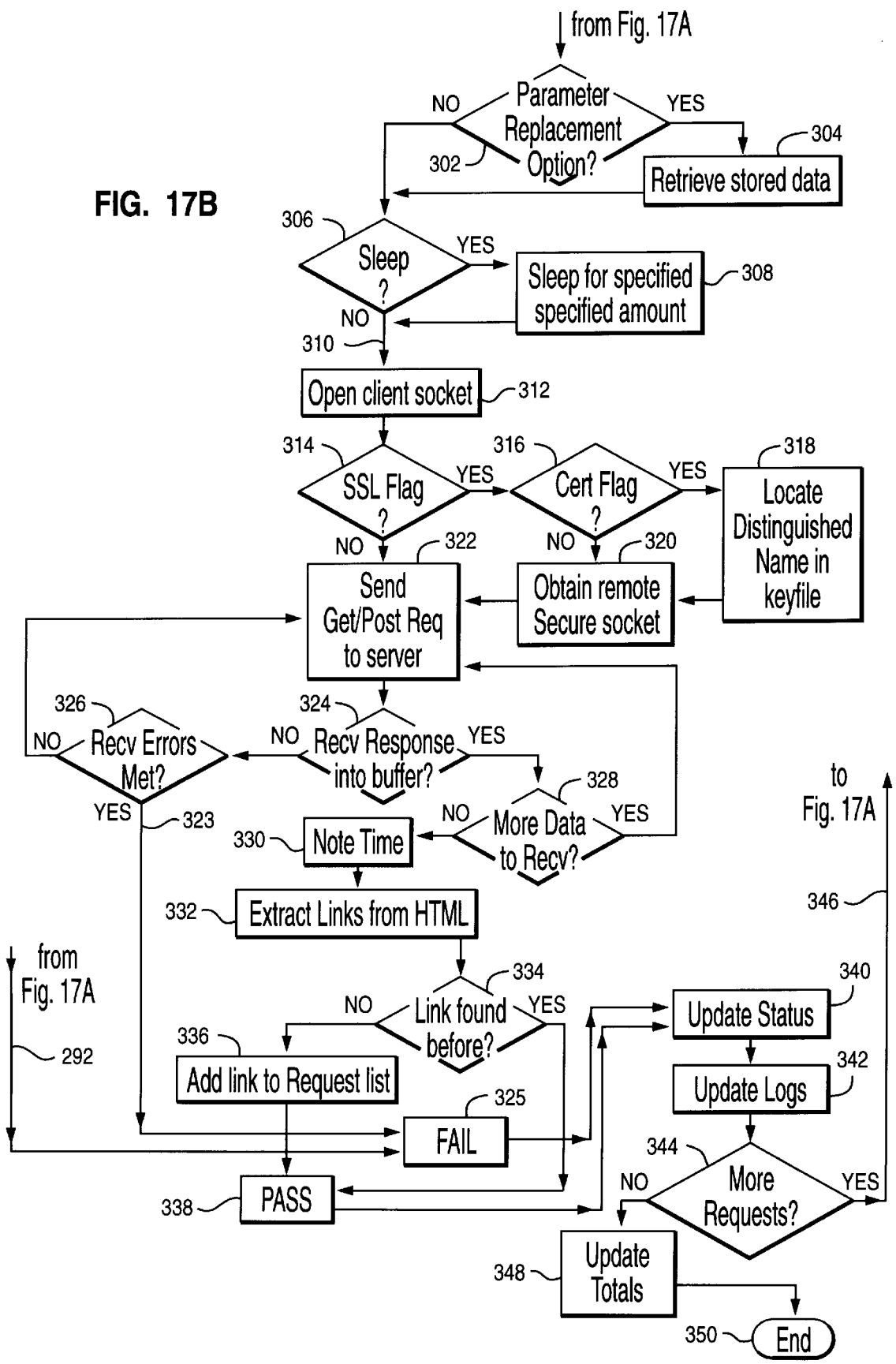

Continuing with the description of the getlinks subsystem flow and FIG. 17B, a client socket is opened, 312, whereupon a query is made of whether an SSL flag has been set, 314. If so, a next query is made of whether a certification flag has been set, 316. If so, the distinguished name in the keyfile is located, 318, whereupon either in response to a certification flag not being set or it being set and the name located, a remote secure socket is obtained, 320.

If an SSL flag has not been set or a remote secure socket has been obtained, flow continues at block 322, whereupon a get/post request is sent to the server. Next, a query is made of whether a receive response is in the buffer, 324. If not, a query is made of whether receive errors have been met, 326. If not met, the process loops back to block 3 to send a next get/post request to the server. If receive errors have been met, the process is in a failed status and exits block 326 along path 323 to fail block 325. If the receive response is in the buffer the process continues out the bottom of decision block 324 to a query of whether more data is to be received, 328. If so, the process loops back to block 3 to send a next get/post request to the server. If no more data is to be received, the time is noted, 330, links are extracted from the HTML, 332, and a query is made of whether with respect to each link it has been found before, 334. If not, the link is added to the request list, 336, the subsystem is in the pass state as indicated by block 338, whereupon the status is updated, 340, the logs are updated, 342, and a query is finally made of whether more requests exist, 344. If affirmative, flow exits along path 346 back to block 282 of FIG. 17A, whereupon the time is noted and the process continues. If no more requests are present, flow exits out the bottom of decision block 344, totals are updated, 348, and the process ends at 350. It will be noted that when the system is in a fail status, 325, the previously described steps of updating status and logs, 340 and 342, respectively, and the subsequent steps will transpire in like manner.

Figure 18:
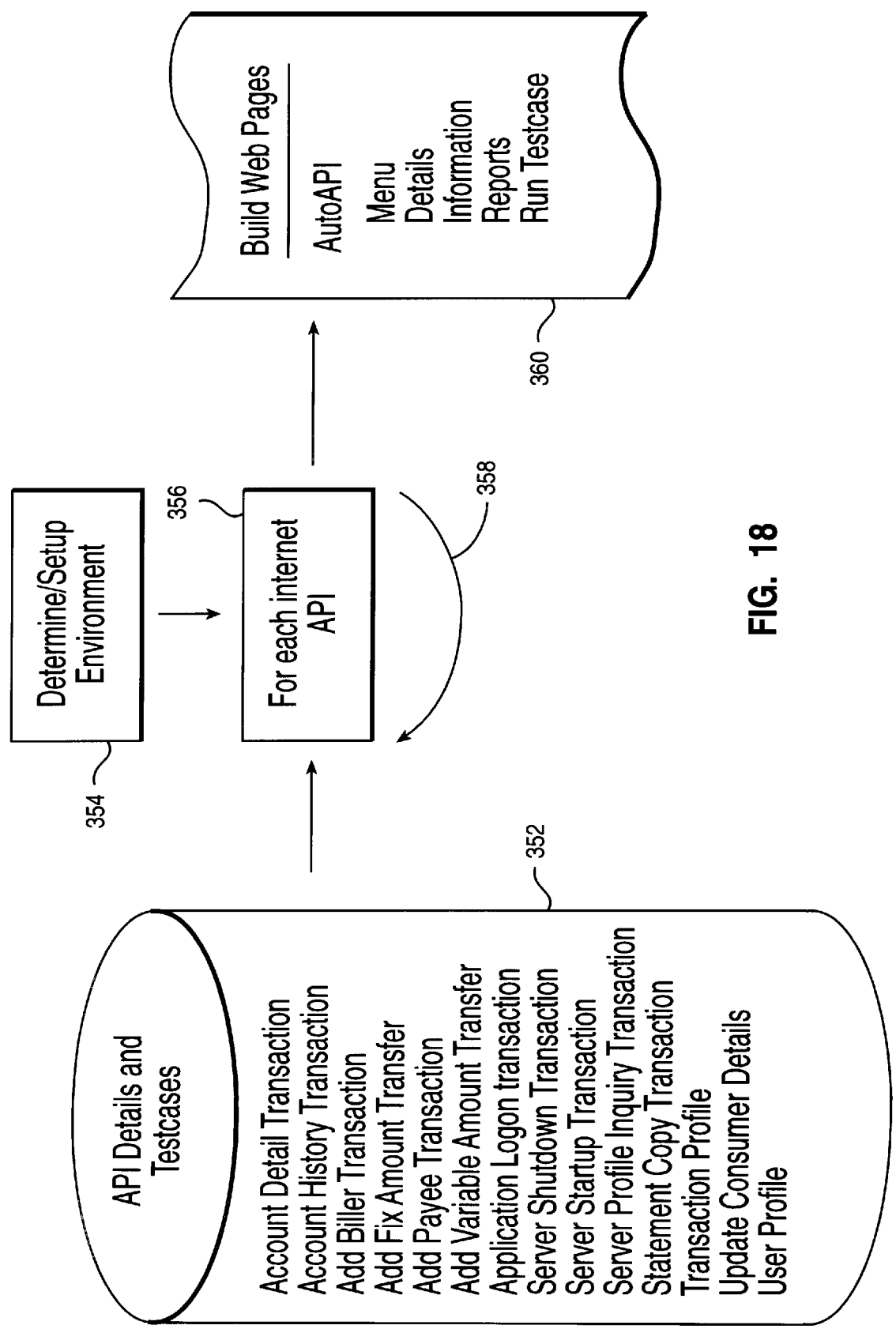
FIG. 18 is a flow diagram illustrating the sequence of operation of the genautoAPI subsystem of FIG. 2.

Turning now to FIG. 18, depicted therein is a flow diagram of the genautoAPI subsystem for generating customizable web server pages to test Internet business transactions. After the environment is determined and/or set up, 354, by means of an input data file and/or user interaction through the GUI edit field so as to specify server, port, and the like hereinbefore previously described, the system will begin retrieving stored API details and test cases, 352, previously discussed (with reference to GMR files 90, test case files 93, etc.) and will build the desired HTML pages, 94, FIG. 7, as shown at step 360. It will be recalled that for a given web application a plurality of APIs will exist such as a transaction for adding a fixed amount or an account history as previously described. Accordingly, in FIG. 18, a loop 358 is shown, indicating that the process for each Internet application transaction API 356 will be repeated, cycling through all the desired API details and transactions until all of the necessary web pages are constructed, 360 necessary to test the desired Internet application 32.

Figure 19A:
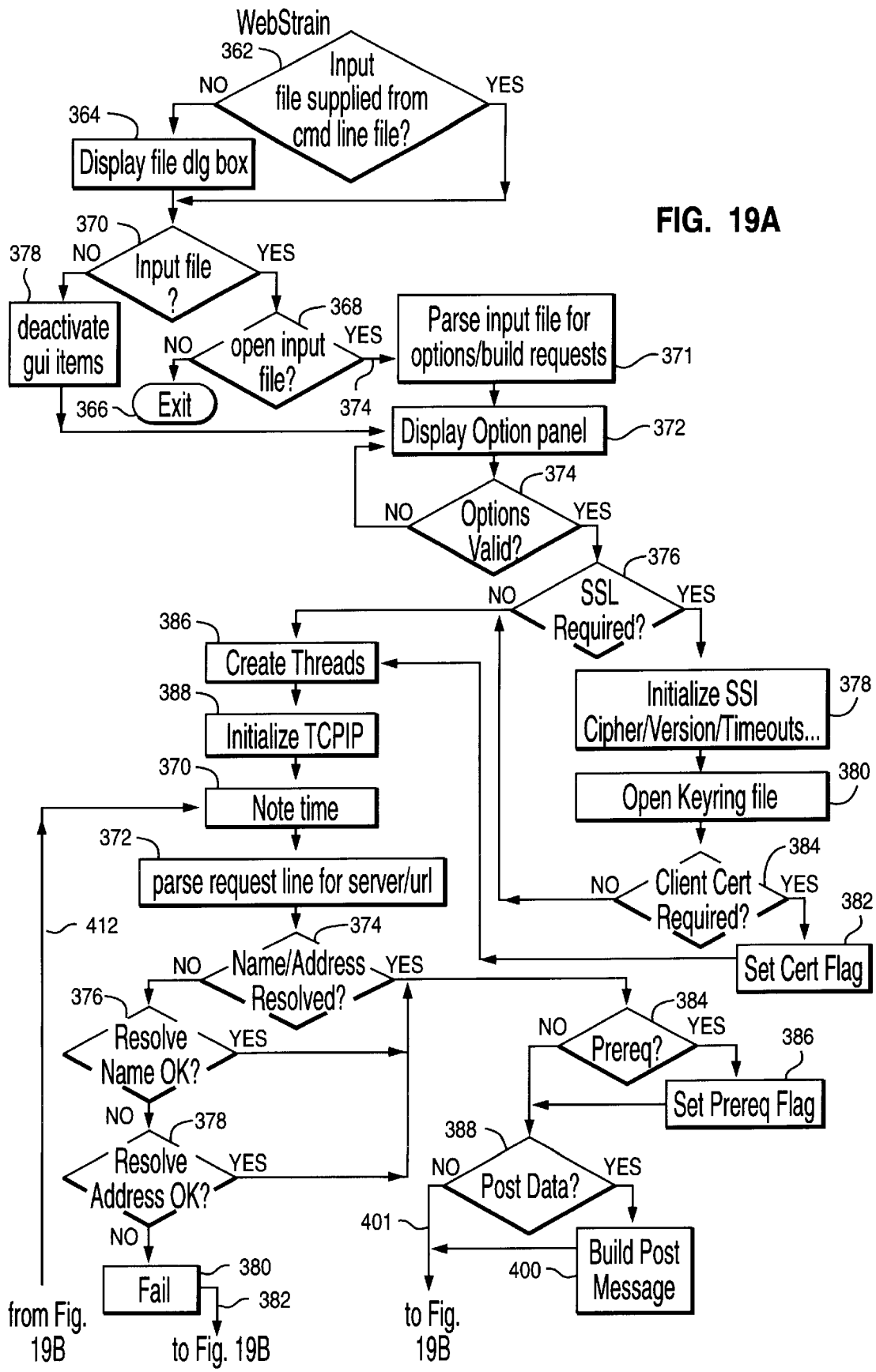
FIGS. 19A–19B is a flow diagram illustrating the sequence of operation of the webstrain subsystem of FIG. 2.
Figure 19B:
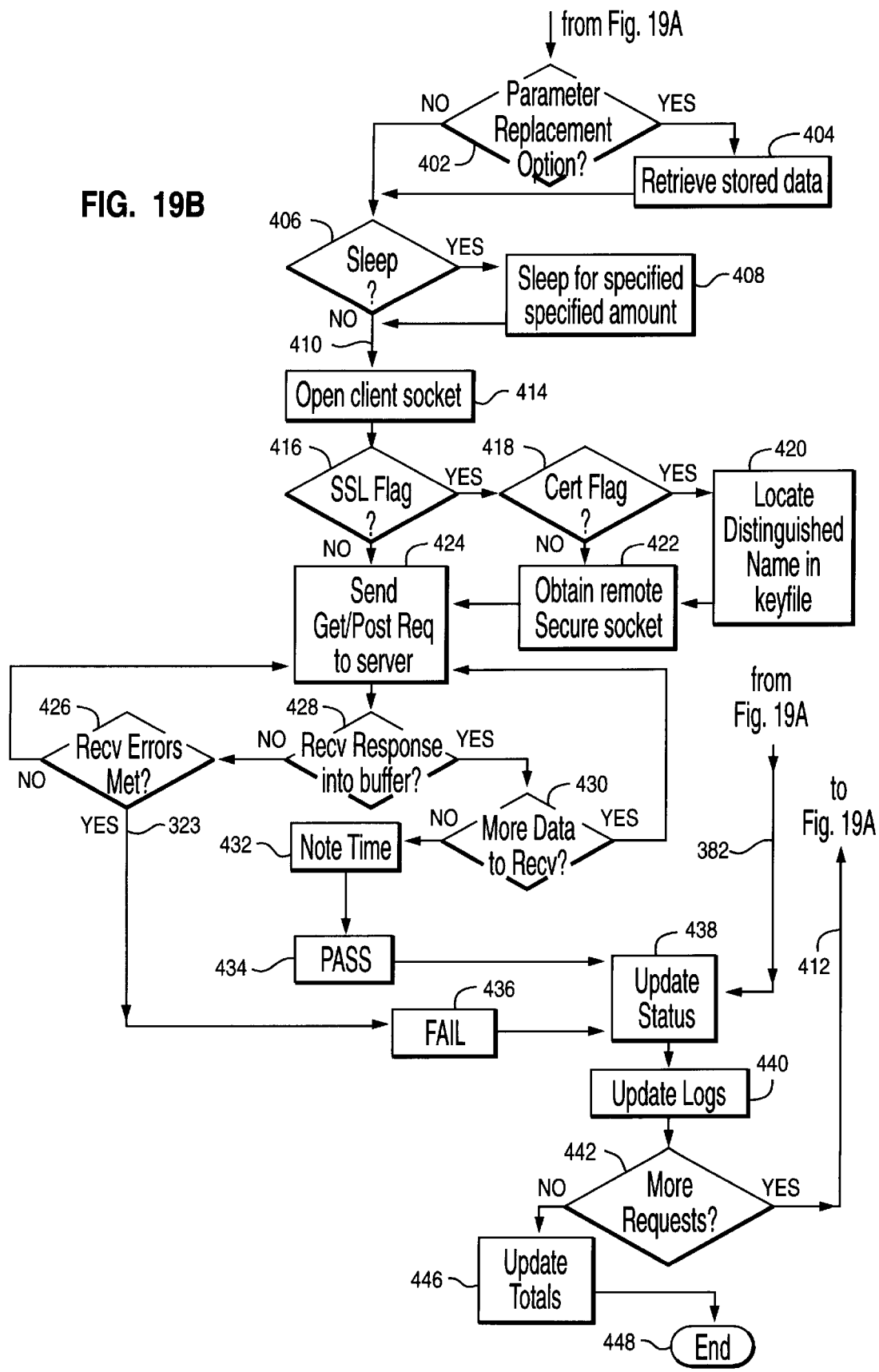

Turning finally to FIG. 19A–19B, depicted therein is a flow diagram of the webstrain subsystem flow. It, as with the getlinks subsystem flow of FIG. 17A–17B, will bear a resemblance to the webrunner subsystem of FIG. 16A–16C which is to be expected inasmuch as the webstrain is to some extent multiple instances of the webrunner virtual browser of FIG. 16A–16C.

Turning now to the description of the flow diagram for the webstrain subsystem illustrated in FIGS. 19A–19B, first a query will be made of whether an input file has been supplied from a command line, e.g., a user-specified GUI field, 362. If not, a file dialog box is displayed, 364. If the input file has been supplied in response to a query of whether it is in fact an input file, 370, if yes, it is determined whether or not to open the input file, 368. If not okay, the process is exited, 366, but if the input file is opened, as indicated by path 374, the input file is parsed for options and build requests 371. If there is no input file as determined by query 370, GUI items are deactivated, 378, and an option panel is displayed, 372. If the panel is displayed, a query is made of whether options are valid, 374. If not, the option panel is again displayed, 372. If so, it is determined whether SSL is required, 376. If so, SSI cipher/version timeouts are initialized, 378, a keyring file is opened 380, followed by a query of whether client certification is required, 384. If not, the process exits to the left of the decision box 384. If certification is required, a certification flag is set, 382. If either SSL is not required, as determined at box 376, or the certification flag is set, 382, or chart certification is not required, 384, a thread is thereby created, 386, the TCPIP connection is initialized, 388, time is noted, 370, and the request line is parsed for the server/URL 372. In response to a query of whether the name/address has been resolved, 374, if not, the process exits to the right and a query is made of whether the name has been resolved, 376. If not, a query is made of whether the address has been resolved, 380. If neither the name or address have been resolved, the process exits to the right along path 382 to FIG. 19B. If the name/address has already been resolved as determined at block 374 or the name has been resolved at 376, or address resolved at 378, the process continues to block 384 to determine whether any prerequisites are required. If so, a prerequisite flag is set, 386. If not, a query is made of whether post data is required, 388. If so, a build post message is displayed, 400. If not, the process exits below block 388 401 to FIG. 19B and a determination is made of whether a parameter replacement option is set, 402. If set, stored data associated with the parameter is retrieved, 404. Next, a query is made of whether a sleep time has been specified, 406. If so, the process sleeps for the specified amount of time, 408, and the process continues along path 410 to FIG. 19B.

Continuing with FIG. 19B, a client socket is then opened, 414, as a result of flow along path 410. A query is made whether an SSL flag has been set, 416. If so, a next query is made whether a certification flag has been set, 418. If so, the distinguished name is located in the keyfile 420. If the certification flag has not been set or the distinguished name has been located, a remote secure socket is obtained, 4. Next, a get/post request is sent to the web site server, 424, after a secure socket has been obtained at block 4 or indication has been received that an SSL flag at block 416 has not been set.

After the get/post request is sent, a query is made of whether a receive response has been placed into a buffer at decision block 428. If not, a query is then made of whether receive errors have been met, 426. If not, the process loops back to block 424 to send another get/post request. If the receive errors have been met as determined by the decision block 426, the system is in a fail state 436. If in response to the query at block 428, a receive response is in the buffer, a next query at 430 determines whether more data is available to be received. If so, the process loops back to block 424 to send a next get/post request to the server. If there is no more data to receive, the flow drops through block 430 to block 432 whereupon the time is noted, the system is in a pass state as indicated by block 434 and the status is updated, 438, as well as the logs being updated, 440. Next a determination is made, 442, whether more requests exist, in which case the process loops back on path 412 to FIG. 19A, whereupon the time is noted, 370, and the process continues. If no more requests are existent, the process drops down from block 442, the totals are updated, block 446, and the process ends, 448. If the process had failed at block 436 or at block 380 as a result of no name or address being resolved, flow continues along path 382 of FIG. 19A and 19B, whereupon again, the status is updated, 438, and the previously described additional process steps associated with blocks 440–448 transpire.

While the invention has been shown and described with reference to particular embodiments thereof, it will be understood by those skilled in the art that the foregoing and other changes in form and detail may be made therein without departing from the spirit and scope of the invention.

What is claimed is:

1. A method for extracting links from an Internet application executing on a web site server and having a plurality of web pages, each of said pages including links for use by an automated web server test and/or strain tool in testing and/or straining said application, comprising:
   generating a get request for a first of at least one of said pages from said application;
   automatically extracting substantially all of said links from said first of said pages;
   storing said extracted links in a format receivable by said test and/or strain tool;
   retrieving said stored extracted links;
   sorting said retrieved extracted links; and
   transferring said sorted extracted links to said test and/or strain tool.

2. The method of claim 1 wherein said format is in a form receivable by both said test and said strain tools.

3. The method of claim 1 further including:
   generating a next get request for a next at least one of said pages from said application;
   automatically extracting substantially all of said links from said next at least one of said pages from said application; and
   storing said extracted links from said next at least one of said pages.

4. The method of claim 1 wherein said sorting is for creating non-typical access paths through said application.

5. The method of claim 4 comprising:

automatically repeating in order said steps of
  generating a next get request;
    automatically extracting substantially all of said links from said next at least one of said pages; and
  storing said extracted links from said next at least one of said pages;
for successive next ones of said at least one of said pages until all of said links for said plurality of web pages are extracted and stored.

6. The method of claim 5 further including:

retrieving all of said extracted links;

sorting said all of said extracted links; and transferring said all of said sorted extracted links to said test and/or strain tool.

7. An apparatus for extracting links from an Internet application executing on a web site server, and having a plurality of web pages, each of said pages including links for use by an automated web server test and/or strain tool in testing and/or straining said application, comprising:

means for generating a get request for a first of at least one of said pages from said application;

means for automatically extracting substantially all of said links from said first of said pages;

means for storing said extracted links in a format receivable by said test and/or strain tool;

means for retrieving said stored extracted links;

means for sorting said retrieved extracted links; and means for transferring said sorted extracted links to said test and/or strain tool.

8. The apparatus of claim 7 wherein said format is in a form receivable by both said test and said strain tools.

9. The apparatus of claim 8 further including:

means for generating a next get request for a next at least one of said pages said application;

means for automatically extracting substantially all of said links from said next at least one of said pages from said application; and means for storing said extracted links from said next at least one of said pages.

10. The apparatus of claim 7 wherein said means for sorting is for creating non-typical access paths through said application.

11. The apparatus of claim 10 comprising:

means for automatically repeating in order said steps of
  repeating in order said steps of generating a next get request;
  automatically extracting substantially all of said links from said next at least one of said pages; and
  for storing said extracted links from said next at least one of said pages;
for successive next ones of said at least one of said pages until all of said links for said plurality of web pages are extracted and stored.

12. The apparatus of claim 11 further including:

means for retrieving all of said extracted links;

means for sorting said all of said extracted links; and means for transferring said all of said sorted extracted links to said test and/or strain tool.

* * * * *